(12) United States Patent
Irwin et al.

(10) Patent No.: US 10,894,183 B2
(45) Date of Patent: *Jan. 19, 2021

(54) STEP PLATFORM

(71) Applicant: Step Fitness & Recreation, Inc., Marietta, GA (US)

(72) Inventors: Lyle Ray Irwin, Woodstock, GA (US); Virginia Miller, Woodstock, GA (US); Bradley Workman, Snellville, GA (US); Sam Crosby, Lilburn, GA (US)

(73) Assignee: STEP FITNESS & RECREATION, INC., Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,157

(22) Filed: Feb. 25, 2019

(65) Prior Publication Data

US 2019/0184228 A1 Jun. 20, 2019

Related U.S. Application Data

(63) Continuation of application No. 14/592,256, filed on Jan. 8, 2015, now Pat. No. 10,252,103.

(51) Int. Cl.
*A63B 23/04* (2006.01)
*A63B 21/00* (2006.01)
(Continued)

(52) U.S. Cl.
CPC .... *A63B 23/0458* (2013.01); *A63B 21/00047* (2013.01); *A63B 21/00189* (2013.01);
(Continued)

(58) Field of Classification Search
CPC .......... A63B 21/00047; A63B 21/4029; A63B 23/0458; B32B 21/14; B32B 27/304;
(Continued)

(56) References Cited

U.S. PATENT DOCUMENTS

| 2,714,007 A | 7/1955 | Jordan |
| 2,820,454 A | 1/1958 | Wright |

(Continued)

FOREIGN PATENT DOCUMENTS

GB 2223955 A 4/1990

OTHER PUBLICATIONS

International Search Report and Written Opinion in related International Patent Application No. PCT/US15/066987, dated Feb. 26, 2016, 9 Pages.

*Primary Examiner* — Jennifer Robertson
(74) *Attorney, Agent, or Firm* — Troutman Pepper Hamilton Sanders LLP; John A. Morrissett

(57) ABSTRACT

A step platform for aerobic exercise may include multiple layers. The top layer may include an elastic foam member that is configured to at least partially deform when stepped on by a user. The middle layer may include a rigid support member that is configured to at least partially maintain the shape of the foam member. The foam member may include a cover that wraps around the foam member and at least a portion of the support member to fasten the support member to the foam member. The bottom layer may include a base member having a support ridge configured to at least partially restrict deformation of the foam member in at least one direction. The base member may be connectable to the support member.

20 Claims, 15 Drawing Sheets

(51) Int. Cl.
- *B32B 21/14* (2006.01)
- *B32B 27/30* (2006.01)
- *B32B 1/00* (2006.01)
- *B32B 3/04* (2006.01)
- *B32B 3/06* (2006.01)
- *B32B 3/30* (2006.01)
- *B32B 5/18* (2006.01)
- *B32B 21/04* (2006.01)
- *B32B 27/06* (2006.01)

(52) U.S. Cl.
CPC ............ *B32B 1/00* (2013.01); *B32B 3/04* (2013.01); *B32B 3/06* (2013.01); *B32B 3/30* (2013.01); *B32B 5/18* (2013.01); *B32B 21/047* (2013.01); *B32B 21/14* (2013.01); *B32B 27/065* (2013.01); *B32B 27/30* (2013.01); *B32B 27/304* (2013.01); *B32B 2250/04* (2013.01); *B32B 2266/0278* (2013.01); *B32B 2307/51* (2013.01); *B32B 2307/7265* (2013.01); *B32B 2571/00* (2013.01)

(58) Field of Classification Search
CPC .... B32B 1/00; B32B 3/04; B32B 3/06; B32B 3/30; B32B 5/18; B32B 21/047; B32B 27/065; B32B 27/30; B32B 2307/51; B32B 2307/7265; B32B 2250/04; B32B 2266/0278; B32B 2571/00
See application file for complete search history.

(56) References Cited

U.S. PATENT DOCUMENTS

| | | |
|---|---|---|
| 3,024,021 A | 3/1962 | Coplin et al. |
| 3,130,964 A | 4/1964 | Johnson |
| 3,207,510 A | 9/1965 | Gibson |
| 3,356,367 A | 12/1967 | Tewksbury |
| 3,582,066 A | 6/1971 | Horace |
| 3,612,520 A | 10/1971 | Chang et al. |
| 3,664,666 A | 5/1972 | Lloyd |
| 3,862,768 A | 1/1975 | England |
| 3,893,667 A | 7/1975 | Snyder, Jr. et al. |
| 3,984,100 A | 10/1976 | Firster |
| 4,037,834 A | 7/1977 | Oaks |
| 4,099,278 A | 7/1978 | Parisi |
| 4,159,826 A | 7/1979 | Hancock |
| 4,183,521 A | 1/1980 | Kroeker |
| 4,191,371 A | 3/1980 | Armer, Jr. |
| 4,199,136 A | 4/1980 | Mansfield |
| D256,141 S | 7/1980 | Lubbe |
| 4,253,661 A | 3/1981 | Russell |
| 4,290,601 A | 9/1981 | Mittelstadt |
| D268,280 S | 3/1983 | Rodger |
| 4,403,773 A | 9/1983 | Swann |
| 4,429,869 A | 2/1984 | Eckstein |
| 4,492,376 A | 1/1985 | Schatz et al. |
| 4,505,477 A | 3/1985 | Wilkinson |
| 4,509,743 A | 4/1985 | Lie |
| 4,516,767 A | 5/1985 | Eskijian |
| D281,343 S | 11/1985 | Krive |
| 4,601,469 A | 7/1986 | Sasser, Jr. |
| 4,603,851 A | 8/1986 | Russell |
| 4,605,224 A | 8/1986 | Torii |
| 4,629,181 A | 12/1986 | Krive |
| 4,645,204 A | 2/1987 | Berger |
| 4,673,180 A | 6/1987 | Rice |
| 4,678,234 A | 7/1987 | Wilson |
| 4,759,542 A | 7/1988 | Hudec |
| 4,787,630 A | 11/1988 | Watson et al. |
| 4,801,140 A | 1/1989 | Bergeron |
| 4,834,458 A | 5/1989 | Izumida et al. |
| 4,880,226 A | 11/1989 | Krantz |
| D306,049 S | 2/1990 | Bancroft |
| 4,905,994 A | 3/1990 | Hartz |
| 5,048,823 A | 9/1991 | Bean |
| 5,066,001 A | 11/1991 | Wilkinson |
| 5,116,045 A | 5/1992 | Jahoda |
| 5,118,096 A | 6/1992 | Wilkinson et al. |
| D330,057 S | 10/1992 | Saunders et al. |
| D330,234 S | 10/1992 | Saunders et al. |
| 5,154,678 A | 10/1992 | Adamczyk et al. |
| 5,162,028 A | 11/1992 | Wilkinson |
| 5,169,360 A | 12/1992 | Saunders |
| 5,176,596 A * | 1/1993 | Ullman ............ A63B 23/0458 108/19 |
| 5,184,987 A | 2/1993 | Wilkinson |
| 5,203,279 A | 4/1993 | Eversdyk |
| 5,213,554 A | 5/1993 | Goldstein et al. |
| 5,232,426 A | 8/1993 | Van Straaten |
| 5,261,864 A | 11/1993 | Fitzpatrick |
| 5,277,675 A * | 1/1994 | Shifferaw ............ A63B 5/08 482/142 |
| 5,290,210 A | 3/1994 | Hand et al. |
| 5,318,489 A | 6/1994 | Irwin |
| 5,322,490 A * | 6/1994 | Van Der Hoeven ........ A63B 69/0022 472/90 |
| 5,387,166 A | 2/1995 | Gvoich |
| D357,517 S | 4/1995 | Traetta |
| D360,664 S | 7/1995 | Stone |
| 5,441,466 A | 8/1995 | Piaget et al. |
| 5,470,292 A | 11/1995 | Simon |
| 5,472,390 A | 12/1995 | Faye |
| D367,369 S | 2/1996 | Lovegrove et al. |
| 5,499,417 A | 3/1996 | Wang |
| D371,176 S | 6/1996 | Furner |
| 5,529,562 A | 6/1996 | Glaser |
| 5,536,072 A | 7/1996 | Chang |
| 5,549,536 A | 8/1996 | Clark |
| 5,558,603 A | 9/1996 | Simon |
| 5,562,575 A | 10/1996 | Gvoich |
| 5,584,779 A | 12/1996 | Knecht et al. |
| 5,591,105 A | 1/1997 | Dalebout et al. |
| 5,620,404 A | 4/1997 | Eyman |
| 5,645,511 A | 7/1997 | Leroux et al. |
| 5,651,753 A | 7/1997 | Wilkinson |
| 5,656,000 A | 8/1997 | Russell |
| 5,658,226 A | 8/1997 | Mentz |
| 5,672,144 A | 9/1997 | Hulme |
| 5,683,331 A * | 11/1997 | Dalebout ............ A63B 23/0458 248/421 |
| 5,730,690 A | 3/1998 | Guidry |
| 5,810,703 A | 9/1998 | Stack |
| D405,135 S | 2/1999 | Scott |
| 5,879,272 A | 3/1999 | Mekjian |
| 5,979,272 A | 3/1999 | Mekjian |
| 5,897,474 A | 4/1999 | Romero |
| 6,012,188 A | 1/2000 | Daniels et al. |
| 6,039,658 A | 3/2000 | Cecchin |
| 6,063,014 A | 5/2000 | Scoggins |
| 6,110,083 A | 8/2000 | Riser |
| 6,117,051 A | 9/2000 | Suarez et al. |
| 6,149,555 A | 11/2000 | Kinback |
| 6,206,805 B1 | 3/2001 | Helton et al. |
| 6,245,001 B1 | 6/2001 | Siaperas |
| 6,299,569 B1 | 10/2001 | Rich |
| 6,312,361 B1 | 11/2001 | Hayes |
| 6,312,364 B1 | 11/2001 | Selsam |
| 6,389,883 B1 | 5/2002 | Berme et al. |
| 6,413,197 B2 | 7/2002 | McKechnie et al. |
| 6,419,611 B1 | 7/2002 | Levine et al. |
| 6,422,983 B1 | 7/2002 | Weck |
| 6,461,285 B1 | 10/2002 | Theunissen et al. |
| 6,551,225 B1 | 4/2003 | Romero |
| 6,558,301 B1 | 5/2003 | Jackson |
| 6,575,885 B1 | 6/2003 | Weck et al. |
| 6,634,998 B2 | 5/2003 | Siaperas |
| 6,702,726 B2 | 3/2004 | Lin |
| 6,719,676 B1 | 4/2004 | Hsu |
| D489,778 S | 5/2004 | Fan et al. |
| 6,740,008 B1 | 5/2004 | Ho et al. |
| D505,460 S | 5/2005 | Dalebout et al. |
| 6,908,417 B2 | 6/2005 | Jackson |

(56) References Cited

U.S. PATENT DOCUMENTS

| | | | |
|---|---|---|---|
| D507,608 S | 7/2005 | Chen | |
| 6,926,643 B1 | 8/2005 | Gvoich | |
| 6,929,588 B2 | 8/2005 | Hobson | |
| 6,988,979 B1 | 1/2006 | Trainor | |
| 7,001,316 B2 | 2/2006 | Jakobs et al. | |
| D517,136 S | 3/2006 | Chen | |
| 7,008,359 B2 | 3/2006 | Fan et al. | |
| 7,207,931 B2 | 4/2007 | Boland | |
| 2002/0137610 A1 | 9/2002 | Broudy et al. | |
| 2003/0045410 A1 | 3/2003 | Kao | |
| 2003/0109365 A1 | 6/2003 | Smith | |
| 2003/0207738 A1 | 11/2003 | Wong | |
| 2005/0020418 A1 | 1/2005 | Lin | |
| 2005/0049125 A1 | 3/2005 | Cloutier et al. | |
| 2006/0040796 A1* | 2/2006 | Holloway | A63B 21/028 482/52 |
| 2006/0128540 A1 | 6/2006 | Engle | |
| 2007/0087902 A1 | 4/2007 | Penat et al. | |
| 2007/0149369 A1 | 6/2007 | Finch | |
| 2010/0029443 A1 | 2/2010 | Kim | |
| 2011/0111935 A1 | 5/2011 | Cole et al. | |
| 2011/0162148 A1 | 7/2011 | Klerer et al. | |
| 2011/0256987 A1* | 10/2011 | Lepore | A63B 23/0458 482/52 |
| 2011/0277909 A1 | 11/2011 | Vecchiola | |
| 2011/0306480 A1 | 12/2011 | Beaulieu et al. | |
| 2012/0244997 A1* | 9/2012 | Thompson | A63B 21/00047 482/27 |

\* cited by examiner

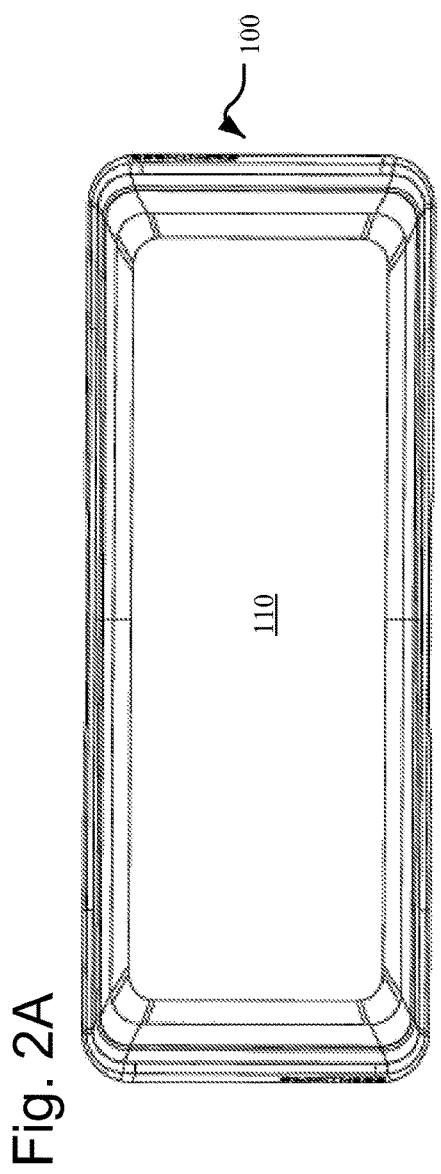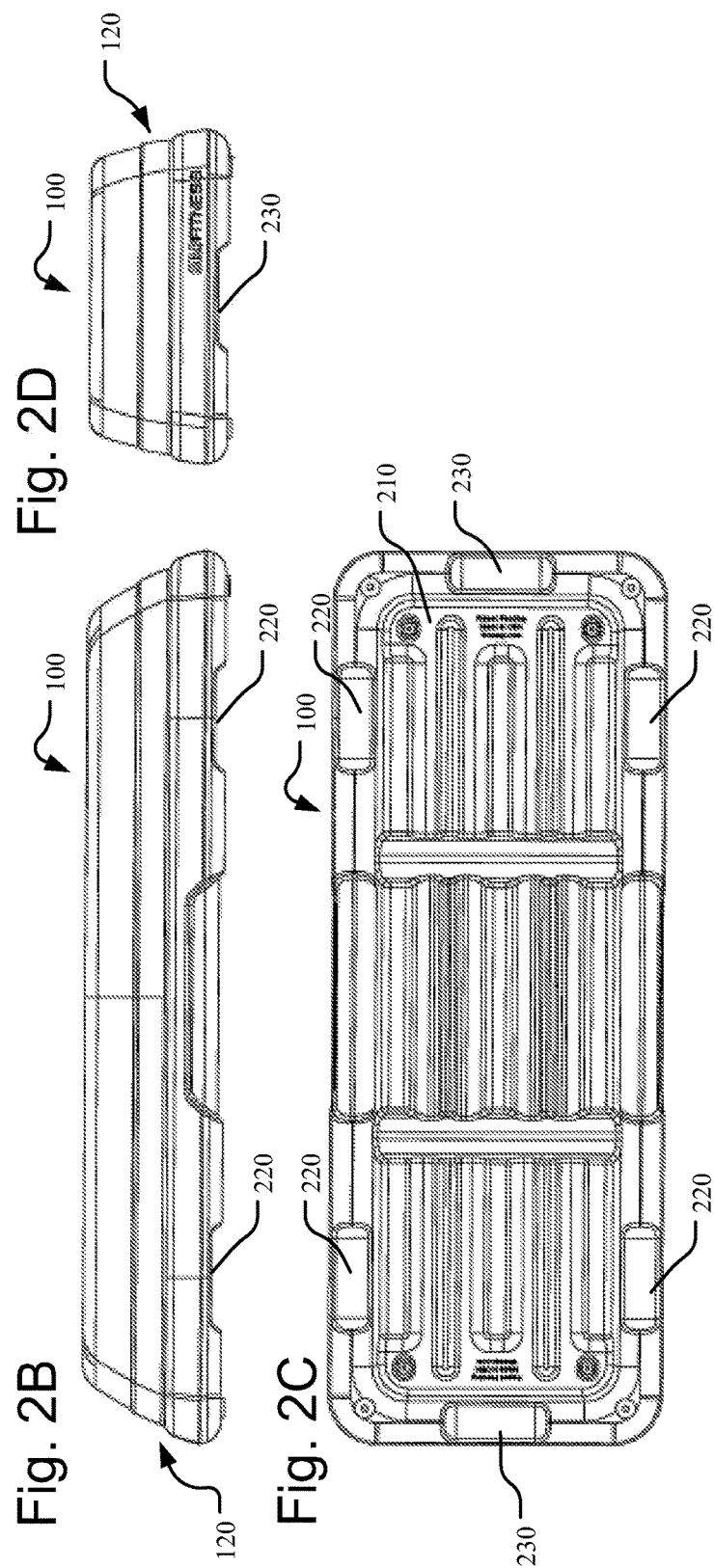

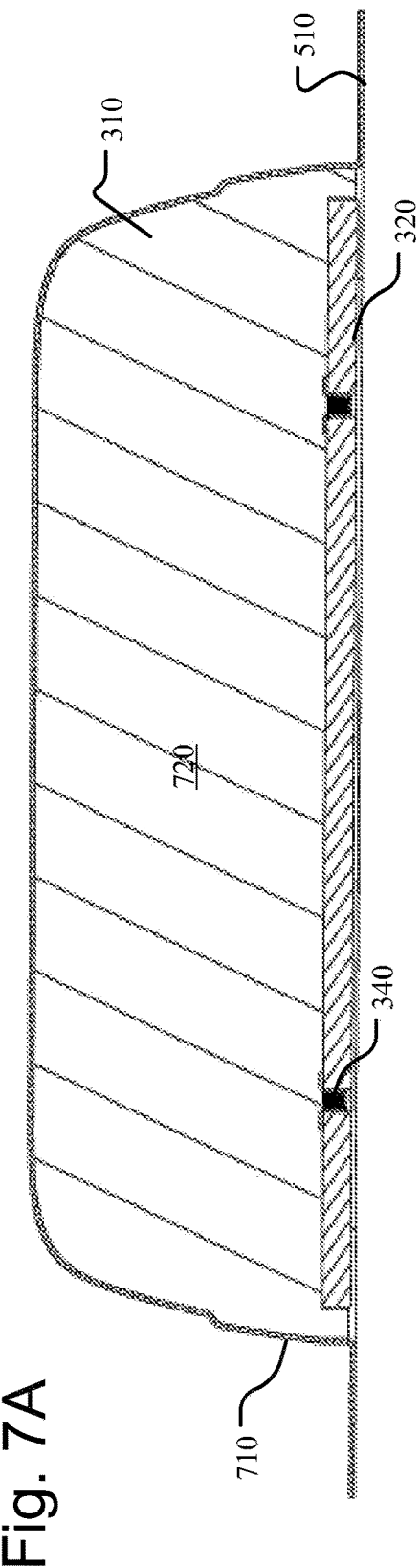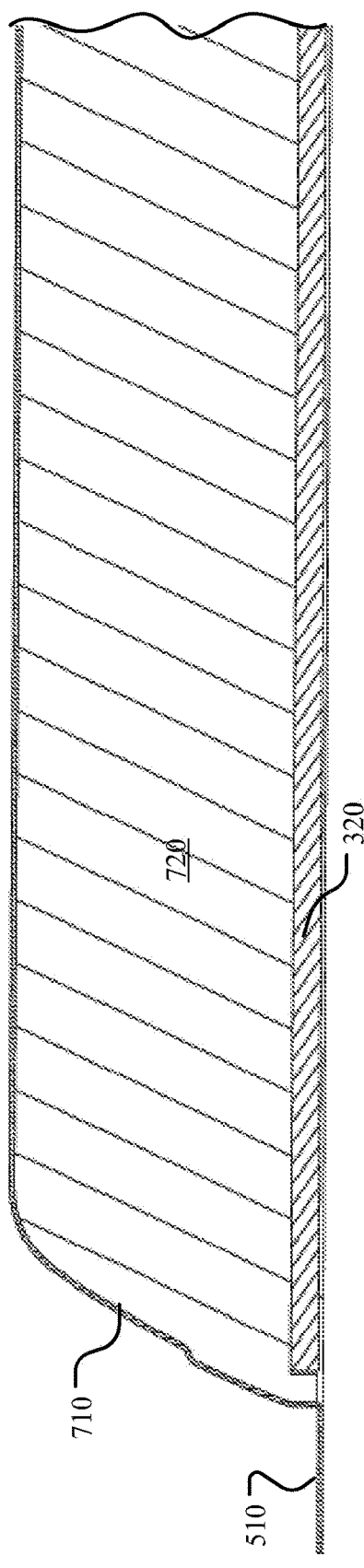

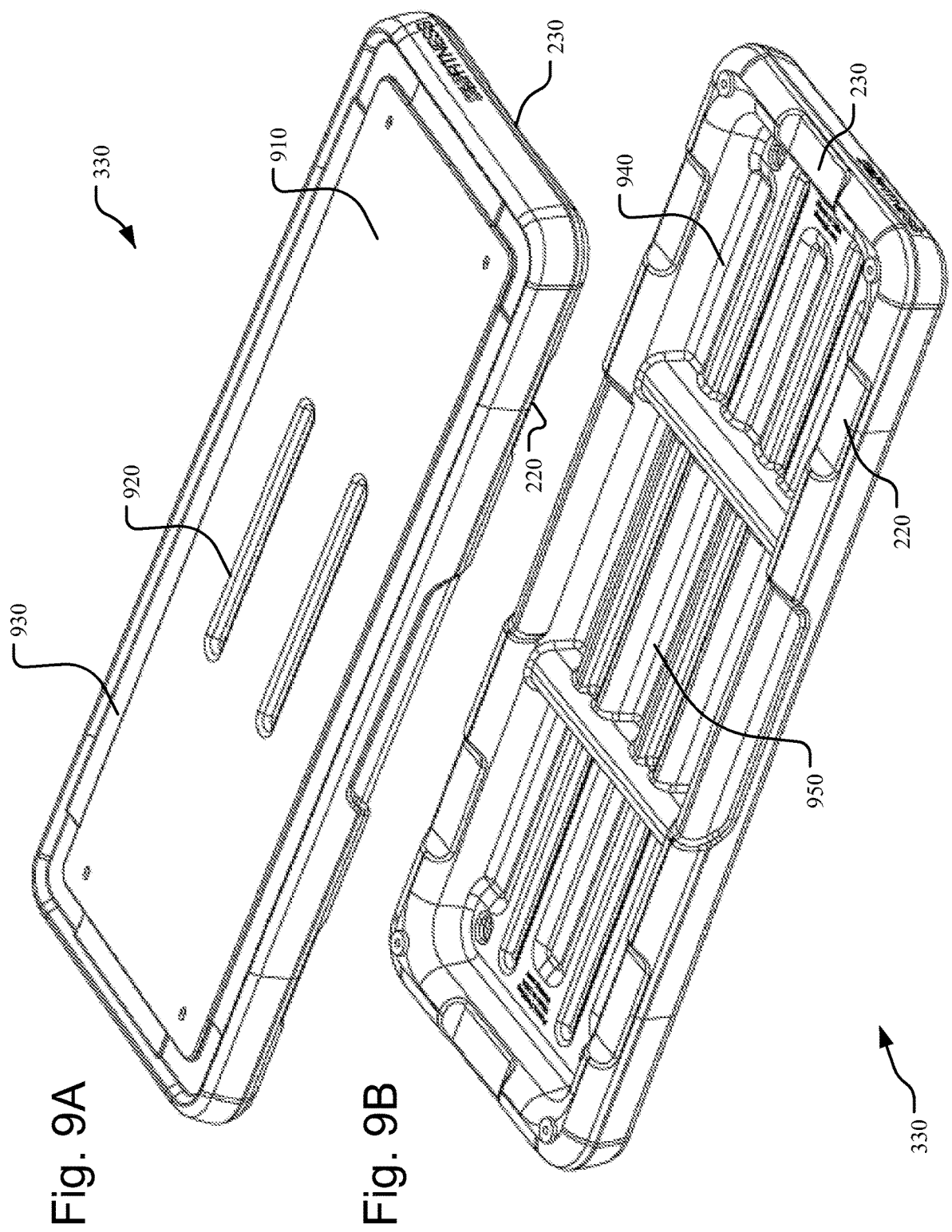

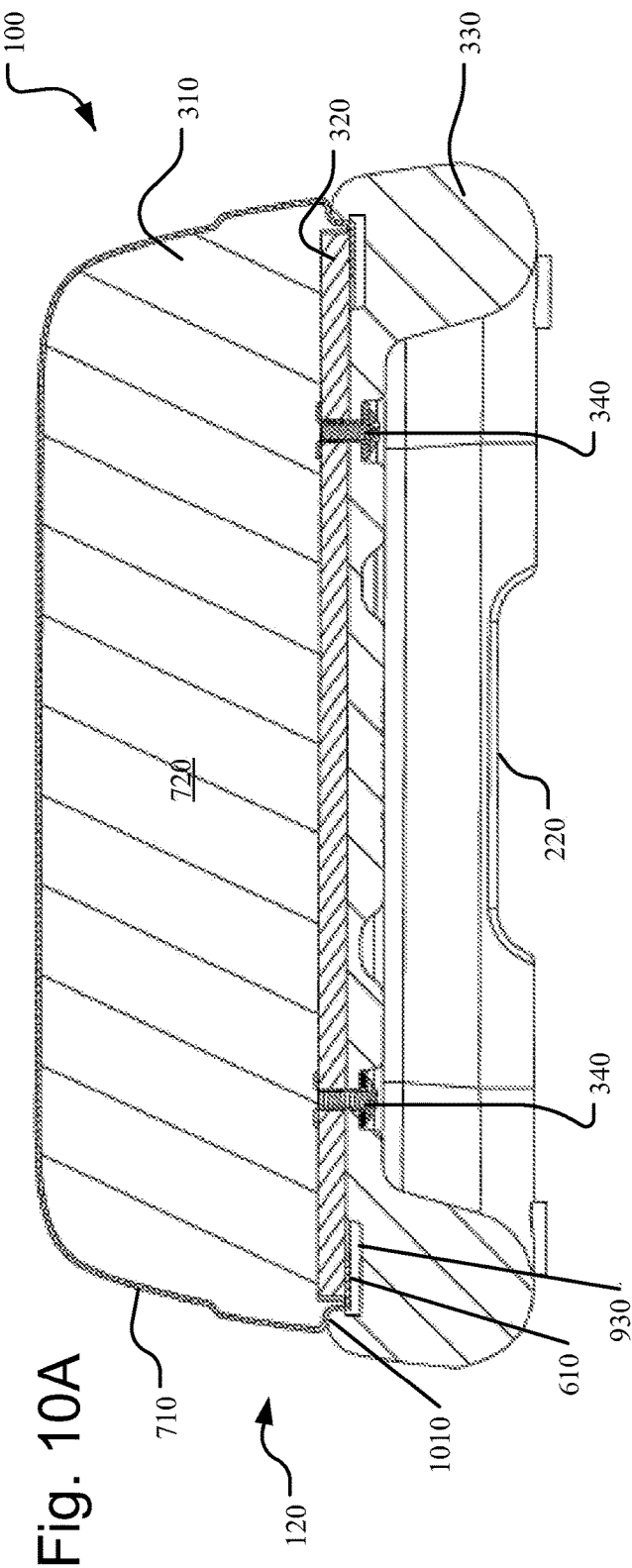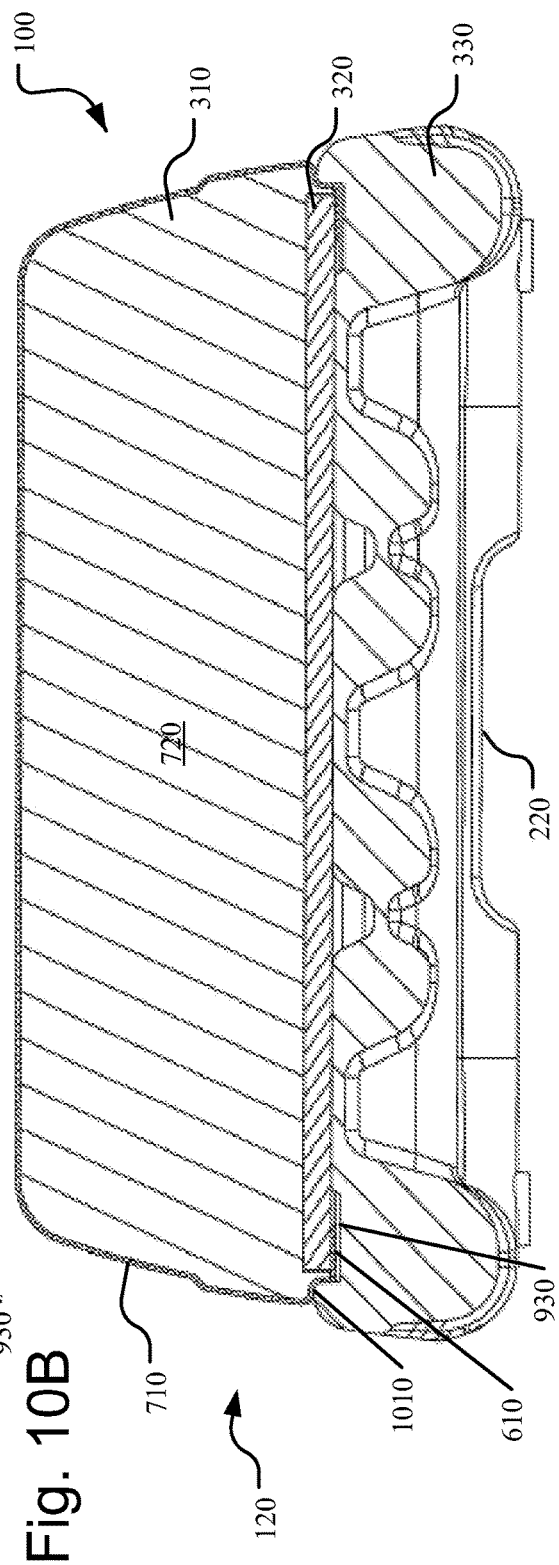

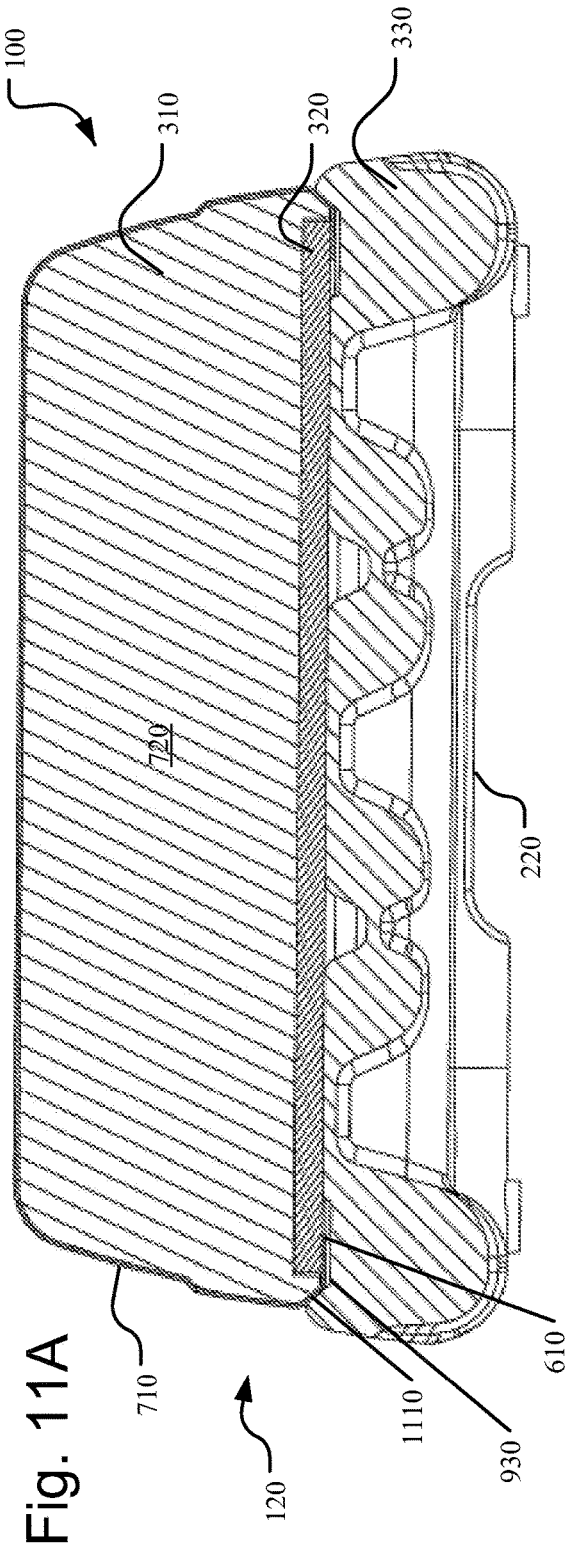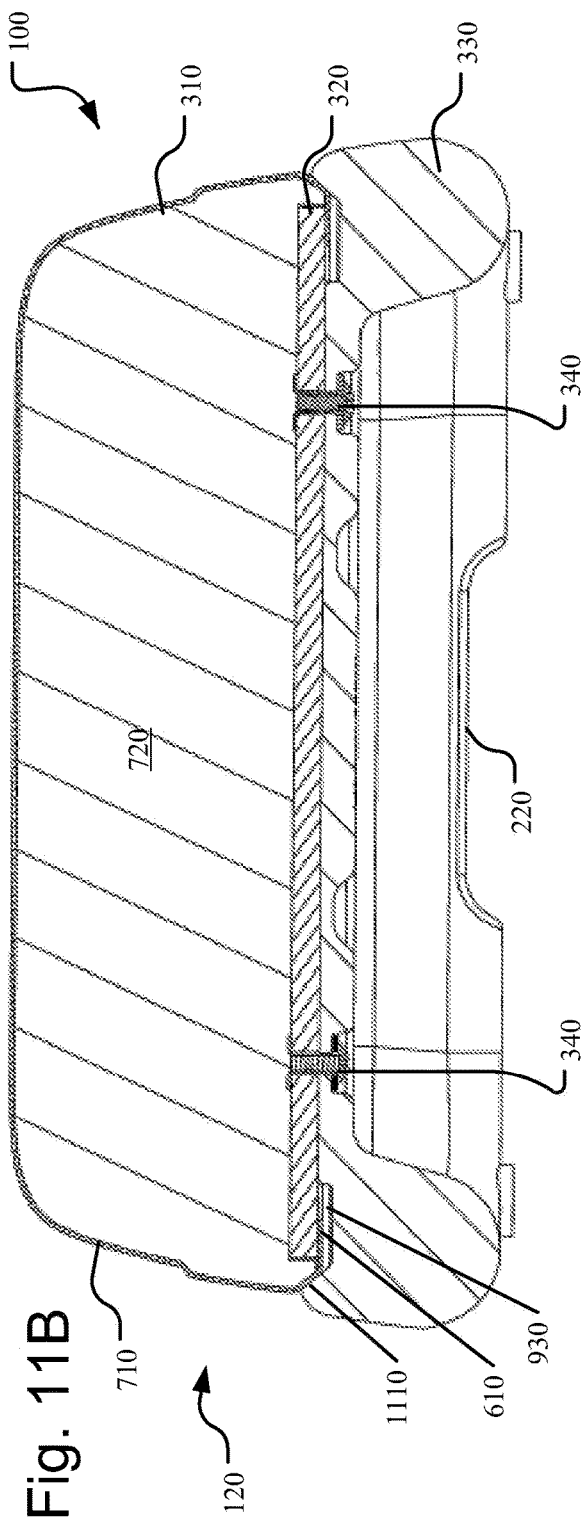

STEP PLATFORM

CROSS REFERENCE TO RELATED APPLICATIONS

This application is a continuation of U.S. patent application Ser. No. 14/592,256, filed Jan. 8, 2015, the entire contents of which is incorporated herein by reference.

FIELD OF THE INVENTION

The invention relates generally to a multi-layered step platform, and more specifically, to a multi-layered step platform for use in aerobic exercise, step training, rehabilitation, or unstable surface training.

BACKGROUND

A common form of aerobic exercise, step aerobics involves stepping up and down onto an elevated platform (a "step platform") using various choreography. Depending on the desired workout, users may vary the type and speed of the movements, the step height, and the exercise duration. Healthy users often participate in step aerobics as a low-impact alternative to high impact aerobic exercise in order to burn calories, reduce stress, and improve functional fitness (e.g., balance, walking, agility, and flexibility). Injured users also utilize step aerobics for rehabilitation following an injury (e.g., an ankle, knee, and hip injury). Using the step platform, a user may focus on a particular muscle or muscle group, thereby accelerating functional fitness and/or rehabilitation.

Step platforms generally consist of a platform seated on a pair of risers that elevate the platform above the ground at a certain height. The risers may vary in height and be stacked on top of one another to raise the height of the platform. Step platforms are often constructed from hard plastics such that they are durable and provide a stable surface during use.

While the available step platforms may be helpful at lowering aerobic exercise impact on a user compared to hard surfaces (e.g., pavement, gym floor, etc.), they may lack cushioning to minimize the impact of repeatedly stepping onto and down from the step platform on a user's body. Further, the available step platforms may not allow for unstable surface training, which has particular advantages. For instance, training on an unstable surface may engage different muscles for balance in addition to a step, squat, or other exercise movement.

For unstable surface training, a user may require an additional device, such as a BOSU ball (i.e., a bottom half of an exercise ball attached to a flat top surface). Though BOSU balls may be helpful for certain movements (e.g. squats), users may have difficulty maintaining balance while stepping onto and down from the BOSU ball, which can lead to falls and additional injuries. Embodiments of the present invention address these needs as well as other needs that will become apparent upon reading the description below in conjunction with the drawings.

SUMMARY

In some exemplary embodiments, the disclosed step platform may include several layers. For example, the top layer may include an elastic foam member configured to at least partially deform when stepped on by a user. Supporting the elastic foam member, a rigid support member may form the middle layer. The support member may be configured to at least partially maintain a shape of the foam member. The foam member and support member may sit on top of a base member that forms the bottom layer. The base member may be configured to sit on one or more risers that lift the step platform off of the ground or to grip the ground surface.

A cover may protect the foam member and wrap around at least a portion of the support member, thereby connecting the support member to the bottom of the foam member. In addition to providing a rigid surface to at least partially restrict deformation of the foam member, the support member may provide an attachment point to the base member via one or more connectors. The base member may include a channel that provides space for the cover to wrap under a portion of the support member so the connected foam and support members can sit flush on top of the base member.

In some examples, the base member may include one or more support ridges configured to at least partially restrict deformation of the foam member. For example, the support ridges may include a contact surface that contacts a portion of the side(s) of the foam member and, when a user steps on the foam member, at least partially prevents the foam member from expanding outwardly along the side(s). The contact surface(s) may be curved or flat and tapered.

In other exemplary embodiments, a disclosed method of manufacturing a step platform may include connecting the support member to the bottom of the foam member, covering the foam member and at least a portion of the support member with the cover, and at least partially compressing the foam member between the support member and the cover. Additionally, the method may include connecting the base member to the support member and at least a portion of the compressed foam member.

The disclosed step platform for aerobic exercise may include an elastic foam member configured to at least partially deform when stepped on by the user. The step platform may also include a rigid support member connectable to a bottom surface of the foam member such that the support member covers at least a portion of the bottom surface. The support member may be configured to at least partially maintain a shape of the foam member. The step platform may further include a base member connectable to the support member, at least a portion of the bottom surface of the foam member, and at least a portion of one or more side surfaces of the foam member. The base member may include a support ridge connectable to at least a portion of the one or more side surfaces of the foam member. The support ridge may be configured to at least partially restrict deformation of the foam member in at least one direction.

In some examples, the foam member may include a moisture-resistant cover. The moisture resistant cover may be configured to at least partially compress the foam member. It is contemplated that the disclosed step platform may further include one or more risers connectable to the base member. In such examples, the one or more risers may have at least one ridge, and the base member may include at least one groove configured to mate with the at least one ridge of the one or more risers. In other examples, the support ridge of the base member may be further configured to at least partially restrict deformation of the foam member in at least two axes. The support ridge may comprise a tapered support ridge having a flat, angled contact surface that is configured to abut at least a portion of the one or more side surfaces of the foam member. The tapered support ridge may taper as it extends inwardly.

The disclosed bench for supporting a user during stepping exercise may have a foam member including an elastic material. The bench may also have a support member connectable to a bottom surface of the foam member. The support member may include a rigid material. Further, the bench may have a base member connectable to at least a portion of the support member and at least a portion of the bottom surface of the foam member.

In some examples, the foam member may include a moisture-resistant cover surrounding the elastic material. The moisture-resistant cover may include vinyl. Further, the foam member may be configured to deform when step on by the user. The elastic material may include urethane foam. The rigid material may include plywood.

In other examples, the disclosed bench may have one or more risers connectable to the base member. The one or more risers may have at least one ridge and the base member may have at least one groove configured to mate with the at least one ridge of the one or more risers. The base member may include a support member that is connectable to at least a portion of one or more side surfaces of the foam member. The support member may include a tapered support ridge having a flat, angled contact surface configured to abut at least a portion of an outermost edge of the one or more side surfaces of the foam member. The tapered support ridge may taper as it extends inwardly.

The disclosed method of manufacturing a step platform for aerobic exercise may include connecting a support member to a bottom surface of a foam member such that the support member partially covers the bottom surface. The support member may have a rigid material and the foam member may have an elastic material. The method may also include covering at least a portion of the foam member and the support member with a moisture-resistant cover, and at least partially compressing the foam member between the moisture-resistant cover and the support member.

In some examples, the method may further include connecting a base member to the support member and at least a portion of the foam member. The base member may be configured to at least partially restrict deformation of the foam member in at least one axis. The step of connecting the base member may include connecting a top surface of the base member to the support member and at least the portion of the bottom surface of the at least partially compressed foam member, and connecting one or more tapered support ridges of the base member to at least a portion of one or more side surfaces of the foam member such that the one or more tapered support ridges at least partially restricts deformation of the foam member in at least two axes.

In other examples, the step of covering at least the portion of the foam member and the support member may include covering a top surface of the foam member, one or more sides of the foam member, a portion of the bottom surface of the foam member, and a portion of the support member. Further, the step of at least partially compressing the foam member may include sealing the moisture-resistant cover in a fixed position such that the moisture-resistant cover at least partially compresses the foam member against the support member.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2A is a top view diagram of a step platform in accordance with an exemplary embodiment of the present invention.

FIG. 2B is a front view diagram of a step platform in accordance with an exemplary embodiment of the present invention.

FIG. 2C is a bottom view diagram of a step platform in accordance with an exemplary embodiment of the present invention.

FIG. 2D is a side view diagram of a step platform in accordance with an exemplary embodiment of the present invention.

FIG. 7A is an exemplary cross-sectional side view diagram of a support member housed within a foam member having a cover forming a lip in accordance with an exemplary embodiment of the present invention.

FIG. 7B is an exemplary cross-sectional front view diagram of a support member housed within a foam member having a cover forming a lip in accordance with an exemplary embodiment of the present invention.

FIG. 9A is an exemplary top view isometric diagram of a base member in accordance with an exemplary embodiment of the present invention.

FIG. 9B is an exemplary bottom view isometric diagram of a base member in accordance with an exemplary embodiment of the present invention.

FIG. 10A is an exemplary cross-sectional side view diagram of a step platform having a curved support ridge and connectors in accordance with an exemplary embodiment of the present invention.

FIG. 10B is an exemplary cross-sectional side view diagram of a step platform having a curved support ridge in accordance with an exemplary embodiment of the present invention.

FIG. 11A is an exemplary cross-sectional side view diagram of a step platform having a tapered support ridge in accordance with an exemplary embodiment of the present invention.

FIG. 11B is an exemplary cross-sectional side view diagram of a step platform having a tapered support ridge and connectors in accordance with an exemplary embodiment of the present invention.

DETAILED DESCRIPTION

Figure 1:
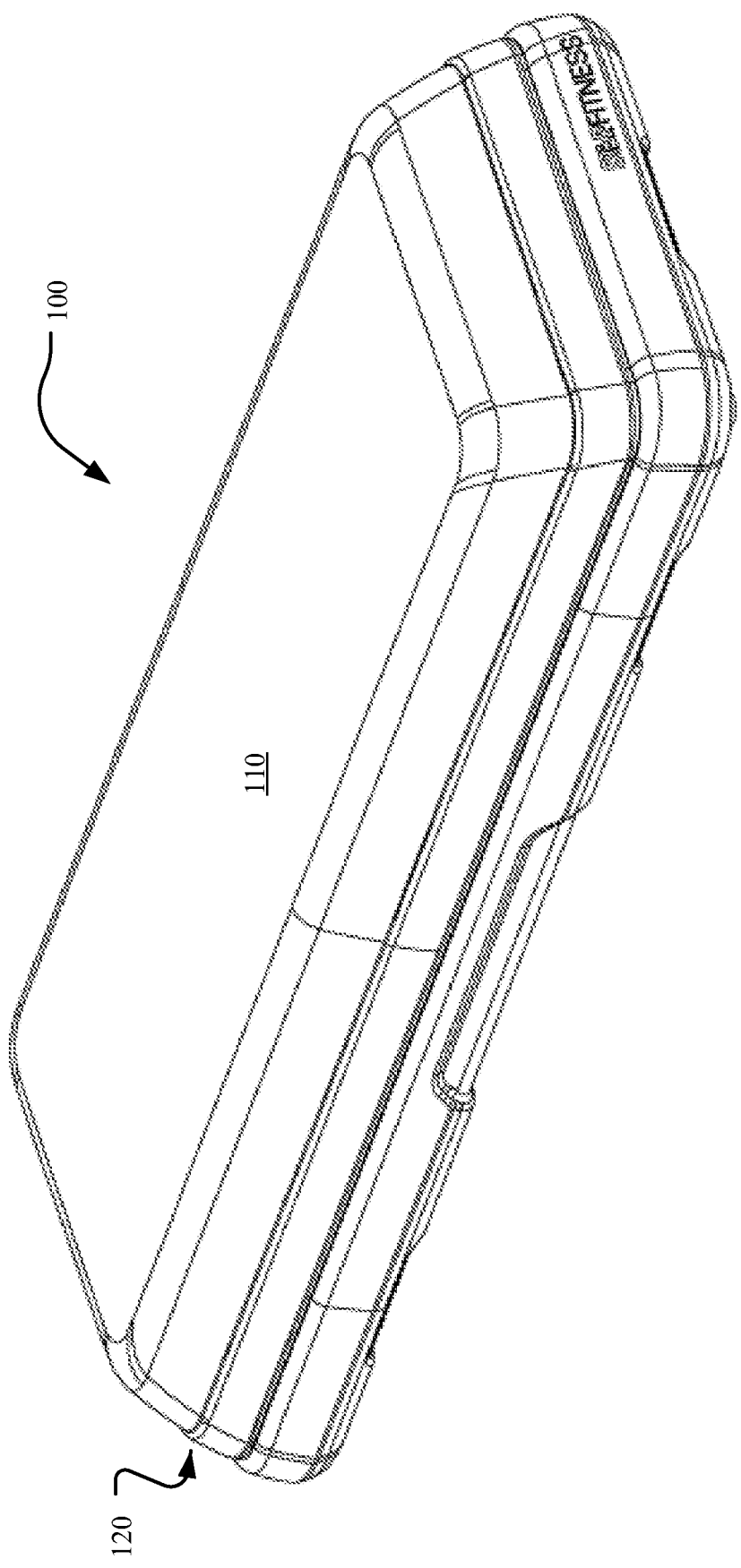
FIG. 1 is an isometric diagram of a step platform in accordance with an exemplary embodiment of the present invention.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It should also be noted that, as used in the specification and the appended claims, the singular forms "a," "an" and "the" include plural references unless the context clearly dictates otherwise. References to a composition containing "a" constituent is intended to include other constituents in addition to the one named.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

To facilitate an understanding of the principles and features of the invention, various illustrative examples are explained below. In particular, the presently disclosed subject matter is described in the context of being a step platform. The present invention, however, is not so limited, and can be applicable in other contexts. For example and not limitation, some examples of the present invention may improve other platforms. These examples are contemplated within the scope of the present invention. Accordingly, when the present invention is described in the context of a step platform, it will be understood that other examples can take the place of those referred to.

In some exemplary embodiments, the disclosed step platform may be a multi-layered step platform. For example, an upper layer may include an elastic foam member configured to at least partially deform when stepped on by a user. A rigid support member forming a middle layer may support the foam member, thereby at least partially maintaining the shape of the foam member. The upper and middle layers may sit on top of a base member that forms a lower layer. Optionally, the base member may be configured to sit on one or more risers that lift the step platform off of the ground or to grip the ground surface.

The elastic nature of the foam member may provide a user with an unstable training surface when the user steps onto the step platform. An unstable training surface can be advantageous for several reasons. For instance, unstable surface training may engage different muscles that a user would otherwise not engage during aerobic exercise on a stable surface. Further, similar to the effect of running on sand versus running on a hard surface, unstable surface training may make an exercise more strenuous than the same exercise on a stable surface. In some examples, the foam member may include elastic and rigid portions, thereby allowing a user to switch between unstable and stable surface training while using the step platform. With either type of training, the foam member may provide a cushion for the user during repeated stepping movements, which may decrease wear on the user's joints. Additionally, the foam member may decrease wear on the user's joints during stepping exercises compared to other products. Specifically, the foam member may be configured to depress completely even at a stepping cadence of over 128 beats per minute (bpm) of music, thereby decreasing the height at which the user steps down from the step platform. At a stepping cadence of over 128 bpm (a stepping cadence of 128 to 134 bpm is typical for stepping exercises), users are less able to control their impact because of the speed of cadence. This quick full depression of the foam member allows the user to step onto a more elevated surface when compared to other products without increased descending impact when stepping down to the ground surface.

To prevent the foam member from deforming too far, the support member may be a plywood or hard plastic placed directly underneath the foam member. In some embodiments, the support member may be housed within a recessed portion of the bottom of the foam member. A protective cover may wrap around the top and sides of the foam member, preventing damage from moisture and other elements. The cover may also wrap around at least a portion of the support member, thereby fastening the support member to the foam member. In this manner, the support member may facilitate attaching the foam member to the base member. To allow the support member to sit flat on top of the base member, thereby avoiding undesired shifting of the support member on top of the base member, the base member may include a channel to provide space for the cover. By allowing the support member to sit flat, the channel may help prevent user falls off of the step platform.

The base member may also include one or more support ridges configured to at least partially restrict deformation of the foam member. For example, the support ridges may include a contact surface that contacts a portion of the side(s) of the foam member and, when a user steps on the foam member, at least partially prevents the foam member from expanding outwardly along the side(s). By at least partially preventing the sideways expansion of the foam member, the support ridges may help maintain an even level of deformation across the top of the foam member. Otherwise, as a user steps near the edge of the step platform during exercise, the foam member could compress further than expected as some of the foam expands sideways, thereby causing the user to fall from the step platform. In some examples, the contact surface(s) may be curved or flat and tapered to help control deformation of the foam member.

The disclosed method of manufacturing a step platform may include connecting the support member to the bottom of the foam member, covering the foam member and at least a portion of the support member with the cover, and at least partially compressing the foam member between the support member and the cover. Additionally, the method may include connecting the base member to the support member and at least a portion of the compressed foam member. By first connecting and covering the support member and the foam member, the support member may provide a hard surface for attaching to the base member and avoid tearing or otherwise damaging the foam member. Further, compressing the foam member may help control deformation of the foam member.

Referring now to the figures, wherein like reference numerals represent like parts throughout the views, examples will be described in detail.

FIG. 1 shows an isometric diagram of an exemplary embodiment of a step platform 100. As shown, the step platform 100 may include a top surface 110 and a substructure 120. The top surface 110 may be configured to support a user when the user steps on or otherwise places weight on the top surface 100 of the step platform 100. Supporting the top surface 100, the substructure 120 may maintain the shape and position of the step platform 100.

FIG. 2A depicts a top view diagram of an exemplary embodiment of the step platform 100. The step platform 100 may include the top surface 110. As shown, the top surface 110 may be rectangular. In other examples, however, the top surface 110 may be a square or other shape based on a user's size and shape and/or the type of exercise. For instance, the top surface 110 may be shaped to support a single foot in some examples, and a pair of feet in other examples. In some examples, the top surface 110 may be about 40 inches by about 13.5 inches. In other examples, the top surface 110 may be about 33.5 inches by about 11 inches. In further examples, the top surface 110 may be about 36 inches by about 12.25 inches.

FIG. 2B shows a front view diagram of an exemplary embodiment of the step platform 100. The step platform 100 may include one or more front/rear grooves 220 (hereinafter the "front grooves") at the bottom where the step platform 100 meets the ground surface. The front grooves 220 may be symmetrically positioned on the front and rear of the step platform 100. Alternatively, in other examples, the front grooves 220 may be positioned only on the front or only on the rear of the step platform 100.

In the embodiment shown in FIG. 2B, the front and/or rear of the step platform 100 may include a pair of front grooves 220. It is contemplated that any number of front grooves 220 may be included on the front and/or rear of the step platform 100. Further, the front grooves 220 may vary in size, shape, and location based on their intended use. For example, the front grooves 220 may be sized, shaped, and located to mate with one or more risers that raise the step platform 100 off of the ground surface. In other examples, the front grooves may be sized, shaped, and located for convenient carrying and transport by the user. Further, in some examples, the front grooves 220 may be sized, shaped, and located to grip the ground surface. In some examples, the front grooves 220 may be about 4 inches long, about 2 inches wide, and about 2 inches deep. In other examples, the front grooves 220 may be about 6 inches long, about 3 inches wide, and about 3 inches deep.

The left and/or right sides of the substructure 120 may taper and/or slant inwardly as it rises towards top surface 110. This taper may provide the user with increased stability while standing on the step platform 100 and make it more difficult for the user to abruptly slide off a side edge of the top surface 110. In some examples, the substructure 120 may be tapered such that it is about 3 inches shorter in length (i.e., from the left side to the right side of the step platform 100) at the top. In other examples, the substructure 120 may be tapered such that it is about 7.5 inches shorter in length at the top. In further examples, the substructure 120 may be tapered such that it is about 10 inches shorter in length at the top.

As shown in FIG. 2C, the bottom of an example of the step platform 100 may include a bottom surface 210, the front grooves 220, and one or more side grooves 230. In some examples, the bottom surface 210 may include one or more ridges or grooves to facilitate mating with one or more risers or to grip the ground surface.

In some embodiments, the side grooves 230 may be sized and/or shaped to match the front grooves 220. In other embodiments, the side grooves 230 may be sized and/or shaped differently from the front grooves 220. For instance, the side grooves 230 may be sized, shaped, and positioned for convenient carrying and transport by the user while the front grooves are sized, shaped, and positioned to mate with the risers or to grip the ground surface. In some examples, the side grooves 230 may be about 4 inches long, about 2 inches wide, and about 2 inches deep. In other examples, the side grooves 230 may be about 6 inches long, about 3 inches wide, and about 3 inches deep.

As shown in FIG. 2C, the bottom surface 210 may be rectangular and/or matching the shape of the top surface 110. In other examples, however, the bottom surface 210 may be a square or other shape based on a user's size and shape and/or the type of exercise or intended use of the step platform 100. For instance, the bottom surface 210 may be shaped to support a single foot in some examples, and a pair of feet in other examples. Additionally, the bottom surface 210 may vary in size and shape to support the top surface 110. For example, the bottom surface 210 may be about 43 inches by about 16 inches. In other examples, the bottom surface 210 may be about 43.5 inches by about 16.25 inches.

FIG. 2D depicts a side view diagram of an exemplary embodiment of the step platform 100. As shown, the side of the step platform 100 may include the side groove 230 at the bottom of each side. The front and/or back sides of the substructure 120 may taper and/or slant inwardly as it rises towards top surface 110. This taper may provide the user with increased stability while standing on the step platform 100 and make it more difficult for the user to abruptly slide off a side edge of the top surface 110. In some examples, the substructure 120 may be tapered such that it is about 3.5 inches shorter in width (i.e., from the front to the back of the step platform 100) at the top. In other examples, the substructure 120 may be tapered such that it is about 4 inches shorter in width at the top. In further examples, the substructure 120 may be tapered such that it is about 5.25 inches shorter in width at the top.

Figure 3:
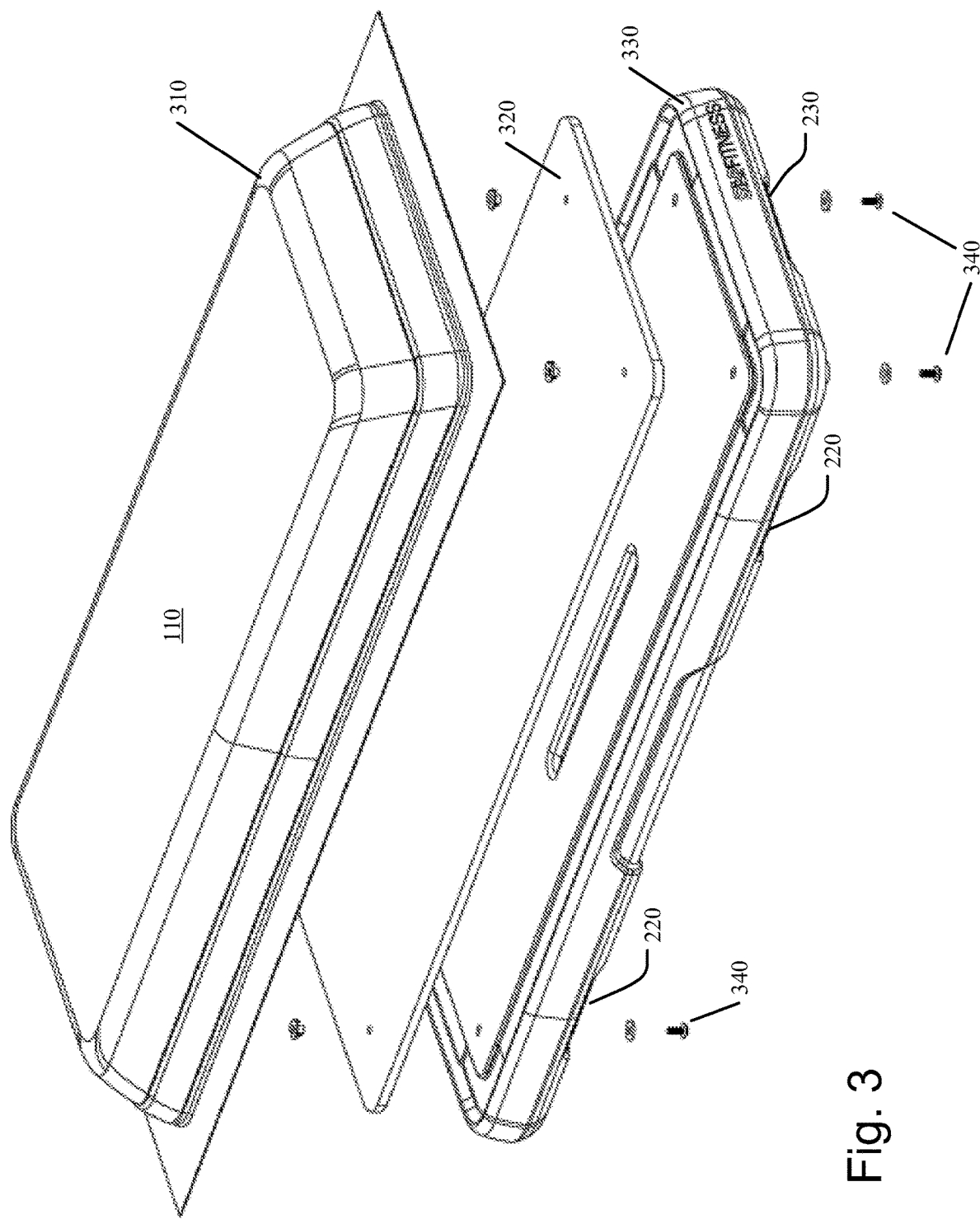
FIG. 3 is an exploded top view diagram of a step platform in accordance with an exemplary embodiment of the present invention.

As shown in FIG. 3, the step platform 100 may include a foam member 310, a support member 320, and a base member 330. The foam member 310 may be configured to house the support member 320 at its bottom, opposite the top surface 110. In some examples, the attached foam member 310 and support member 320 may be connected to the base member 330 via one or more connectors 340.

In some embodiments, the foam member 310 may include polyurethane or other known materials to construct foams, such as, for example, synthetic rubber, isocyanate-based materials, and styrene-butadiene rubber. In some examples, the foam member 310 may be flexible such that it changes in shape when weight or pressure is applied to the foam member 310. For instance, in one embodiment, the foam member 310 may be configured to fully depress when stepped on even when the user is stepping at a cadence of over 128 bpm, a speed of cadence at which users are typically less able to control their impact. This quick full depression during stepping allows a user to step onto a more elevated surface (i.e., on top of the expanded foam) without increasing descending impact stepping down to the ground surface as the foam member 310 fully depresses so the user's foot leaves the top surface 110 at a lower height. In some examples, the foam member 310 may be resilient such that it returns to its original shape after deforming when stepped on by a user. The foam member 310 may have a resiliency that allows it to return to its original shape prior to a user's next step even at a cadence of over 128 bpm. It is contemplated that memory foams may be used to slow down the recoiling rate of the foam member 310. By being flexible and/or resilient, the foam member 310 may provide a user with an unstable surface to train on, while the step platform 100 provides a safe platform for the user to step onto and down from. Additionally or alternatively, the foam member 310 may provide the user with a cushioned stable surface or unstable surface to train on.

The foam member 310 may also include one or more protective materials to protect the foam member 310 from moisture or other elements. For example, the foam member 310 may include vinyl or another plastic along at least the top surface 110, such as a cover 710. Further, the top surface 110 may be textured or include patterns to provide additional grip for a user. In other examples, the top surface 110 may include rubber or plastic ridges to provide additional grip for the user.

The support member 320 may include rigid materials, such as, for example, rigid foams, plastics, woods, or metals. In some examples, the support member 320 may include plywood. The support member 320 may be rigid such that it at least partially maintains the shape of at least part of the foam member 310. For example, when a user steps on step platform 100, the top surface 110 may partially compress where the user's feet are placed while the bottom of the foam member 310 maintains its shape and position against the support member 320. In other examples, the support member 320 may be configured to partially bend and/or flex to allow a limited amount of flexibility of the entire foam member 310. As shown, the support member 320 may include one or more holes for connecting to the base member 330 via the connectors.

It is contemplated that different support members 320 may be used based on the user's desired exercise. For example, the support member 320 may be less rigid when the user desires a less stable surface for unstable surface training. The support member 320 may be more rigid when the user desires a platform for stable surface training.

The base member 330 may include any materials to house the foam member 310 and the support member 320 off of the ground surface and/or connect to one or more risers. For example, the base member 330 may include rigid foams, plastics, woods, or metals. In some examples, the base member 330 may include additional rigid support structures to increase the rigidity of the support member 320. In other examples, the base member 330 may include lightweight materials and be shaped and sized to minimize the weight of the step platform 100. For example, the base member 330 may be hollow to further decrease the weight of the step platform 100.

The connectors 340 may include metal, plastic, and/or wood screws, washers, nuts, pins, screws, snapping devices, wires, or other connection devices. In some embodiments, the connectors 340 may be configured to permanently connect the support member 320 to the base member 330. In other embodiments, the connectors 340 may be configured to temporarily connect the support member 320 to the base member 330, and allow for quick assembly and disassembly of the step platform 100. The temporary connection may be particularly advantageous when a user desires to swap out the foam member 310 and support member 320 configured for, for example, unstable surface training, with another foam member 310 and support member 320 configured for stable surface training. The temporary connection via the connectors 340 would allow the user to use the same base member 330 while tailoring the step platform 100 to the desired exercise. In some examples, the connectors 340 may include galvanized coatings or other treatment coatings to prevent rust or corrosion. Further, the connectors 340 may be sealed to prevent rust or corrosion.

Figure 4:
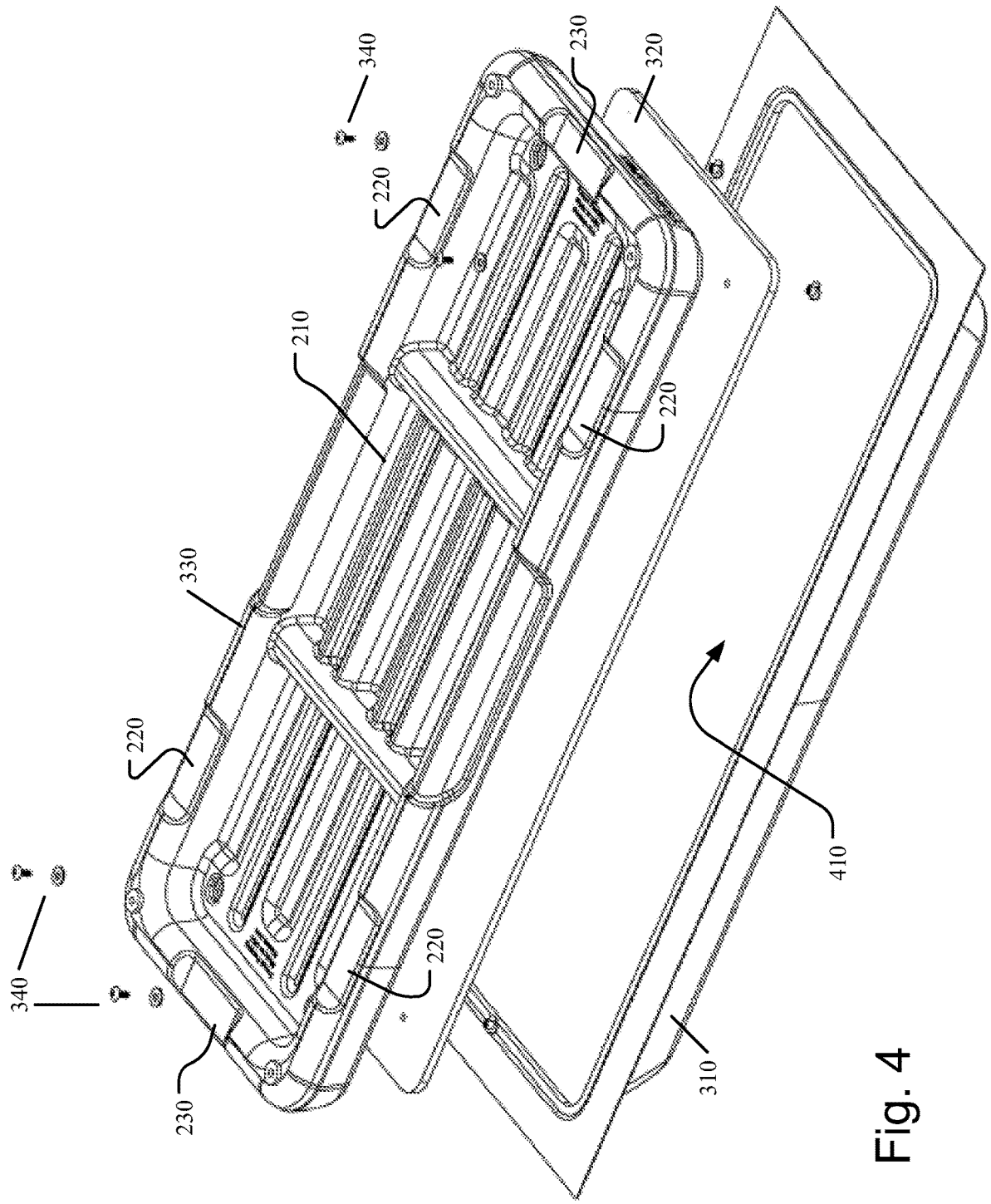
FIG. 4 is an exploded bottom view diagram of a step platform in accordance with an exemplary embodiment of the present invention.

FIG. 4 provides a bottom view of the exploded view diagram shown in FIG. 3. As shown, the bottom of the base member 330 may include several holes for the connectors 340. Further, the foam member 310 may include a recessed portion that is shaped to receive the support member 320.

Figure 5:
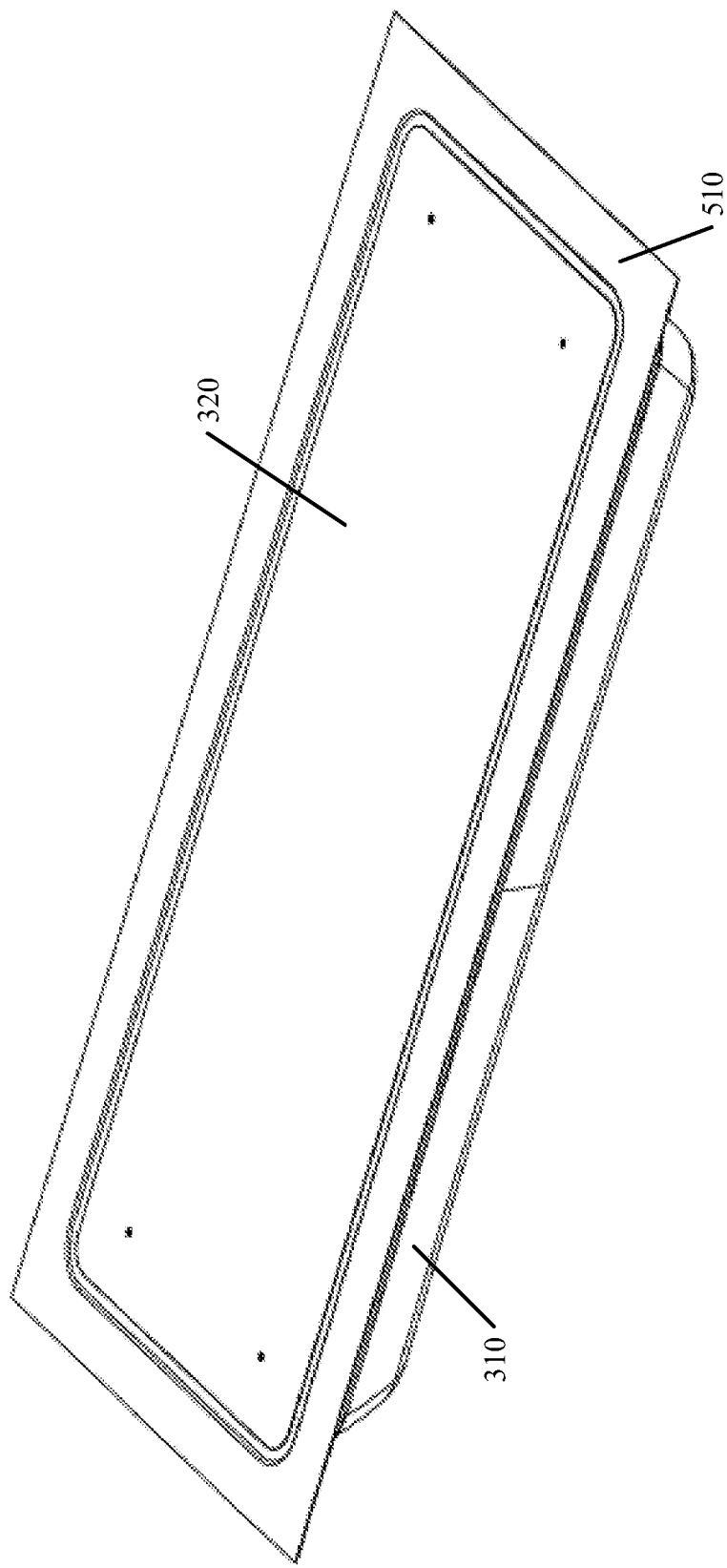
FIG. 5 is an exemplary bottom view isometric diagram of a support member housed within a foam member in accordance with an exemplary embodiment of the present invention.

When housed within a recessed portion 410 the foam member 310, as shown in FIG. 5, the support member 320 may be flush with the bottom of the foam member 310. In other examples, the support member 320 may at least partially extend beyond the bottom of the foam member 310. The dimensions of the recessed portion 410 may vary based on the size of the support member 320. The foam member 310 may include a lip 510 that extends outwardly from the bottom of the foam member. For example, the lip 510 may be an extension of the cover 710. In some embodiments, the lip 510 may include vinyl or another plastic. In other examples, however, the lip 510 may include other materials, such as wood or metal.

Figure 6:
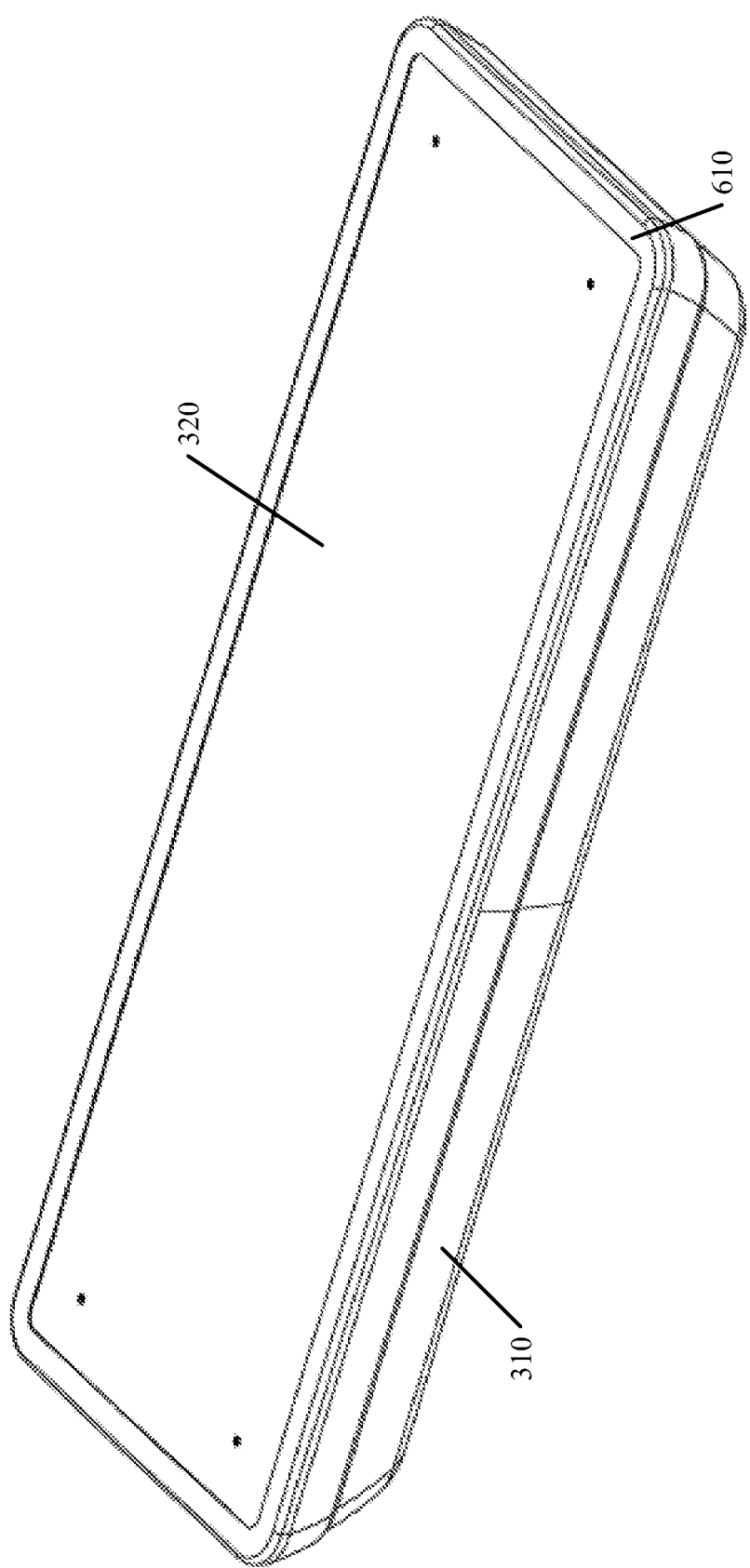
FIG. 6 is an exemplary bottom view isometric diagram of a support member sealed within a foam member in accordance with an exemplary embodiment of the present invention.

In some embodiments, as shown in FIG. 6, the lip 510 may form a seal 610 after the support member 320 is placed within the recessed portion 410. The seal may be formed via mechanical means, such as nails or staples, or via chemical means, such as glue or other adhesives. Additionally or alternatively, the seal 610 may be connected to the support member 320 via mechanical and/or chemical means. In other embodiments, the lip 510 may be folded down over the support member 320 and attached to itself to form the seal 610. The seal 610 may for an air-tight or waterproof seal between the foam member 310 and the support member 320, thereby protecting the foam member 310 and the support member 320 from moisture and other elements. While the example in FIG. 6 shows the seal 610 formed proximate to the perimeter of the bottom of the foam member 310, it is contemplated that the seal may fully cover the support member 320. In such examples, the seal 610 may include holes to allow for the connectors to attach the support member 320 to the base member 330. The holes in the seal 610 may be configured to protect the foam member 310 and the support member 320 from moisture and other elements.

The seal 610 may mechanically fasten the foam member 310 to the support member 320. Thus, the support member 320 may be connected to the base member 330, which mechanically connects the foam member 310 to the base member 330. This overcomes the difficulty of connecting a foam material to the base member 330 via the connectors 340. In other examples, however, the foam member 310 may include rigid materials that provide a connection point for the connectors 340.

FIG. 7A shows an exemplary cross-sectional side view diagram of the support member 320 housed within the foam member 310. As shown, the foam member 310 may include the cover 710 and a foam core 720.

The cover 710 may at least partially cover the foam member 310, for example on the sides and top surface 110 of the foam member 310, to protect the foam member 310 from moisture or other elements. Additionally, the cover 710 may make the foam member 310 more durable during stepping, thereby lengthening the life of the step platform 100. In some embodiments, the cover 710 may include vinyl or another plastic. Further, the cover 710 may be textured or include patterns to provide additional grip for a user. In other embodiments, the cover 710 may include rubber or plastic ridges to provide additional grip for the user. The cover 710 may extend beyond the foam member 310 to form the lip 510.

In some embodiments, the cover 710 may be elastic and configured to at least partially shape the foam member 310. For example, the cover 710 may shape and/or limit the expansion of the foam member 310 along the front, back, and/or sides of the foam member 310. In other embodiments, the cover 710 may be rigid and configured to at least partially restrict deformation of the foam member 310. For example, the cover 710 may limit the expansion of the foam member 310 along the front, back, and/or sides of the foam member 310, which may limit deformation of the foam member 310 during stepping exercises.

The foam core 720 may include polyurethane or other known materials to construct foams, such as, for example, synthetic rubber, isocyanate-based materials, and styrene-butadiene rubber. In some examples, the foam core 720 may be flexible such that it changes in shape when weight or pressure is applied to the foam member 310. In some examples, the foam core 720 may be resilient such that it returns to its original shape after deforming when stepped on by a user. It is contemplated that memory foams may be used to slow down the recoiling rate of the foam core 720 and to reach a desired resiliency.

In some embodiments, as shown, the connectors 340 may extend through support member 320 and face outwardly from the foam core 720 towards the base member 330. In other embodiments, the connectors 340 may only extend partially through the support member 320 and face outwardly from the support member 320 toward the base member 330. It is contemplated that the support member 320 may include one or more rigid structures, such as metal or hard plastic plates or discs, to secure the position of the connectors 340 within the support member 320 and to prevent the connectors 340 from tearing or damaging the support member 320 when the connectors 340 are overly tightened.

It is contemplated that the foam member 310 and/or the support member 320 may each include different materials or structures at different cross-sections along their lengths or widths. This may tailor the step platform 100 to a particular exercise or allow a user to switch between stable and unstable surface training. For example, the foam member 310 may include four sequential segments alternating between elastic and rigid foams. The user may step on the elastic foam segments for unstable surface training, and then step over to the rigid foam segments for stable surface training. Alternatively, in other embodiments, the foam core 720 and other materials of the foam member 310 and the support member 320 may be uniform in material and structure throughout the step platform 100.

In contrast to the side view cross-sections shown in FIG. 7A, FIG. 7B shows an exemplary front cross-section of the support member 320 housed within the foam member 310. As shown, the lip 510 may extend from the sides and/or the front and back of the foam member 310.

Figure 8A:
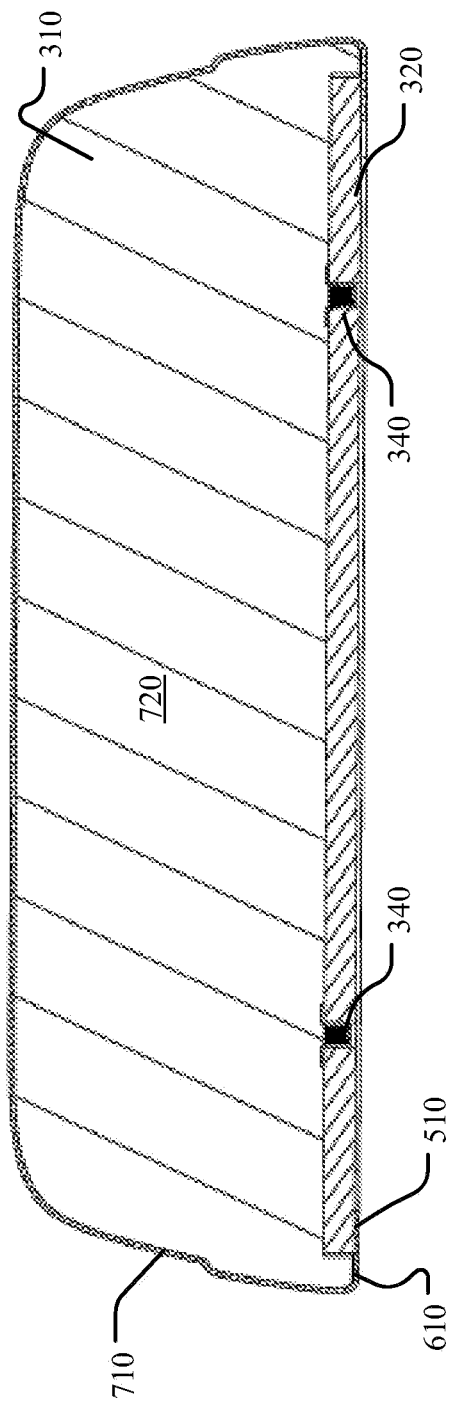
FIG. 8A is an exemplary cross-sectional side view diagram of a support member housed within a foam member having a cover forming a seal in accordance with an exemplary embodiment of the present invention.

In FIG. 8A, the lip 510 shown in FIG. 7A may be affixed to at least a portion of the bottom of the foam core 720 and/or the support member 320 to form the seal 610. The seal 610 may protect the foam core 720 from moisture and other elements. It is contemplated that the seal 610 may extend to fully cover the bottom of the support member 320. In some embodiments, the seal 610 may include holes to allow the connectors to pass through the seal 610 from the support member 320 to the base member 330.

As mentioned with respect to FIG. 7A, the foam member 310 and/or the support member 320 may each include different materials or structures at different cross-sections along their lengths or widths. It may be advantageous to configure the foam core 720 to be more rigid in some places and more flexible in other places. For example, the top surface 110 may include graphics outlining a first pair of feet for unstable surface training and a second pair of feet for stable surface training. In this example, the foam core 720 may be more flexible in the cross-sections supporting the first pair of feet and more rigid in the cross-sections supporting the second pair of feet. Enabling the user to quickly switch between stable and unstable surface training may avoid the need for additional equipment and improve the workout experience. In some embodiments, the cover 710 may include a more durable material in certain portions of the top surface 110 (e.g., the middle) known to wear quicker than other portions of the top surface 110 (e.g., the edges).

It is contemplated one or more of the cover 710, the foam core 720, and the support member 320 may be structurally or materially different in some cross-sections of the step platform 100. For example, it may be more cost-effective to vary the structure and/or material of the cover 710 than the foam core 720 and, as a result, the cover 710 may vary in structure and/or material while the structure and/or material of the foam core 720 remains uniform.

Figure 8B:
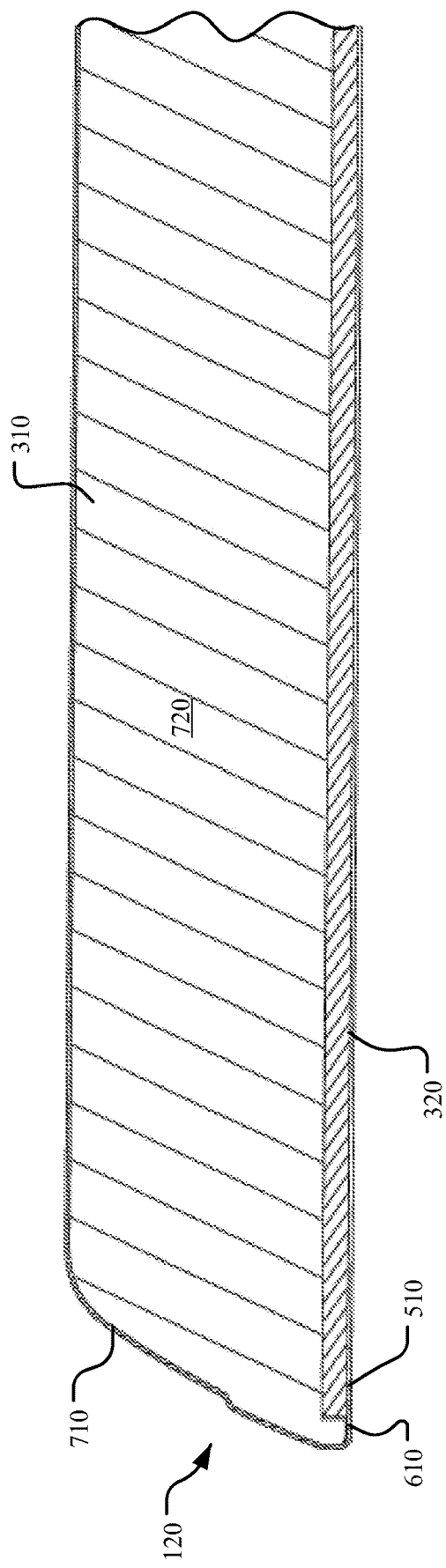
FIG. 8B is an exemplary cross-sectional front view diagram of a support member housed within a foam member having a cover forming a seal in accordance with an exemplary embodiment of the present invention.

In contrast to the side view cross-sections shown in FIG. 8A, FIG. 8B shows an exemplary front cross-section of the support member 320 sealed within the foam member 310. As shown, the cover 710 may extend over the top and left and/or right sides of the foam member 310, and at least partially extend over the bottom of the foam member 310 to form the seal 610. The seal 610 may also cover at least a portion of the support member 320.

FIG. 9A shows an exemplary isometric diagram of the base member 330. The base member 330 may include a base table 910 with one or more holes for receiving connectors 340. The base table may include one or more tack-offs 920 that create an area of material that comes from the top of the mold during molding, which helps the material from the top of the mold contact and melt into the bottom of the mold. The tack-offs 920 may also improve a user's grip during transportation of the base member 330 when the step platform 100 is disassembled. Additionally, the base member 330 may include a channel 930 proximate the perimeter of the base member 330 to provide clearance space for the portion of the cover 710 on the bottom of the foam member 310 and on the support member 320. This allows the support member 320 to lay flat on top of the base member 330, avoiding unwanted shifts between the support member 320 and the base member 330 during use of the step platform 100. The channel 930 may vary in size based on the clearance space required for the cover 710.

Base member 330 may taper and/or slant inwardly as it rises towards base table 910, as shown in FIG. 9A. The size and taper of the base member 330 may correspond to the size and taper of the rest of the substructure 120, thereby providing the user with increased stability while standing on the step platform 100 and making it more difficult for the user to abruptly slide off a side edge of the top surface 110. Additionally, the taper of the base member 330, along with the base table 910, may provide a clean, repeatable surface for mating the foam member 310 to the base member 330 without creating a manufacturing issue. For example, at about 40°, the taper of the base member 330 will form a wider corner between its sides and the base table 910 than if the sides were not tapered (e.g., the sides were vertical). During blow molding, this wider corner may enable the blowing of plastic fully into the corner so the corner can be fully filled with plastic during molding, thereby providing a clean, repeatable surface for mating with the foam member 310. The tapered sides of the base member 330 may also decrease the time and cost associated with manufacturing, as the wider corner improves the efficiency of blow molding.

It is contemplated that the base table 910 may serve in place of the support member 320 or support the support member 320. In such examples, the base table 910 may include rigid materials, such as, for example, rigid foams, other plastics, woods, or metals. For instance, the base table 910 may include plywood. The base table 910 may be rigid such that it at least partially maintains the shape of at least part of the foam member 310 and/or the support member 320. For example, when a user steps on step platform 100, the top surface 110 may partially compress where the user's feet are placed while the bottom of the foam member 310 maintains its shape and position against the support member 320 and/or the base table 910. In other examples, the base table 910 may be configured to partially bend and/or flex to allow a limited amount of flexibility of the entire foam member 310 and/or the support member 320.

In other examples, the base table 910 may serve as a connection point for the foam member 310 and the support member 320 to the base member 330 without providing structural support. In such examples, the base table 910 may include lightweight materials and be shaped and sized to minimize the weight of the step platform 100. Further, the base member 330 may include one or more cross members having holes in lieu of or in addition to the base table 910 to reduce the weight of step platform 100 or to provide additional structural support.

As shown in the bottom view of the base member 330 in FIG. 9B, the base member 330 may include a base bottom 940 having one or more bottom grooves 950, front grooves 220, and side grooves 230. The base bottom 940 may form the bottom surface 210 of the step platform 100. The bottom grooves 950 may increase the strength of the base member 330. In some examples, the base bottom 940 may include protective materials and/or a protective coating to protect the step platform 100 from moisture and other elements.

FIG. 10A depicts a cross-sectional side view diagram of an exemplary embodiment of the step platform 100. As shown, the base member 330 may include a curved support ridge 1010 positioned to support at least a portion of the side of the foam member 310. The curved support ridge 1010 may at least partially maintain the shape of the front, back, and/or side(s) of the foam core 720. For instance, the curved support ridge 1010 may at least partially prevent the foam core 720 from expanding outwardly in its front, back, and sides when stepped on. The curved support ridge 1010 may also maintain the position of the foam member 310 and the support member 320 on top of the base member 330 in lieu of or in addition to the connectors 340. Due to its location, the curved support ridge 1010 may include a contact surface that at least partially contacts the seal 610 and/or the cover 710. The contact surface of the curved support ridge 1010 may be curved. In some embodiments, the contact surface of the curved support ridge 1010 may extend approximately vertically at the innermost portion of the contact surface and extend approximately horizontally at the outermost portion of the contact surface.

Figure 10C:
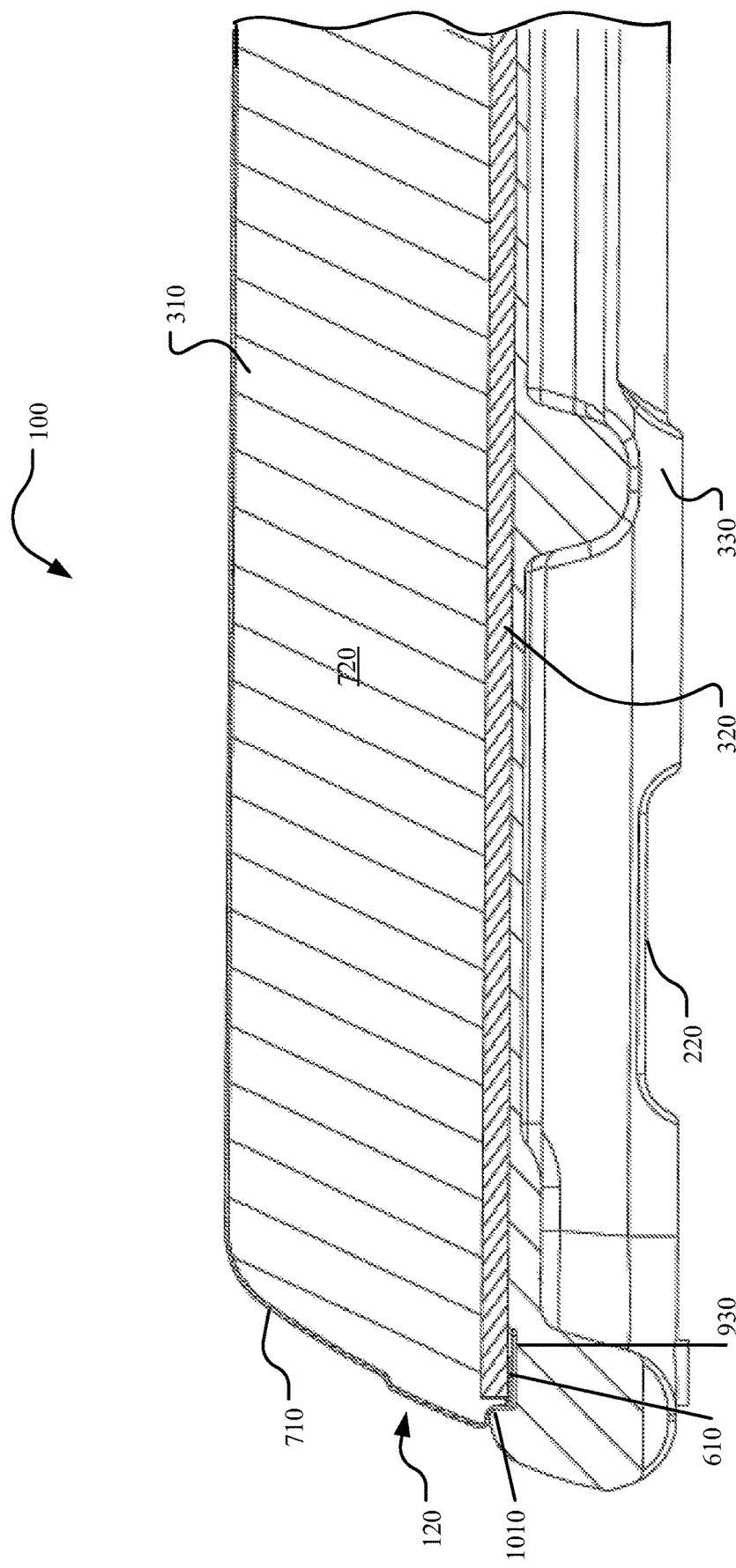
FIG. 10C is an exemplary cross-sectional front view diagram of a step platform having a curved support ridge in accordance with an exemplary embodiment of the present invention.

The curved support ridge 1010 may extend along at least a portion of the front, back, and/or sides of the top of the base member 330. For example, the curved support ridge 1010 may extend along the front and back of the base member 330 such that it contacts the side of the foam member 310, as in the cross-section shown in FIG. 10A and as in another exemplary cross-section shown in FIG. 10B. In another example, as shown in FIG. 10C, the curved support ridge 1010 may extend along a side of the foam member 310 to at least partially prevent the foam core 720 from expanding outwardly in its side.

FIG. 11A depicts another exemplary cross-sectional side view diagram of the step platform 100. As shown, the base member 330 may include a tapered support ridge 1110 positioned to support at least a portion of the side of the foam member 310. The tapered support ridge 1110 may at least partially maintain the shape of the front, back, and/or side(s) of the foam core 720. For instance, the tapered support ridge 1110 may at least partially prevent the foam core 720 from expanding outwardly in its front, back, and sides. The tapered support ridge 1110 may also maintain the position of the foam member 310 and the support member 320 on top of the base member 330 in lieu of or in addition to the connectors 340. Due to its location, the tapered support ridge 1110 may at least partially contact the seal 610 and/or the cover 710. In some examples, the tapered support ridge 1110 may include a flat, angled contact surface that abuts against the seal 610 and/or the cover 710. The tapered support ridge 1110 may taper as it extends inwardly towards a center of the base member 330. In such examples, the tapered contact surface may be flat and angled at about 20° to 80° from a horizontal axis of the base member. In some embodiments, the tapered support ridge 1110 may aid the enabling of the foam core 720 to "replace" itself when it is dislodged.

Figure 11C:
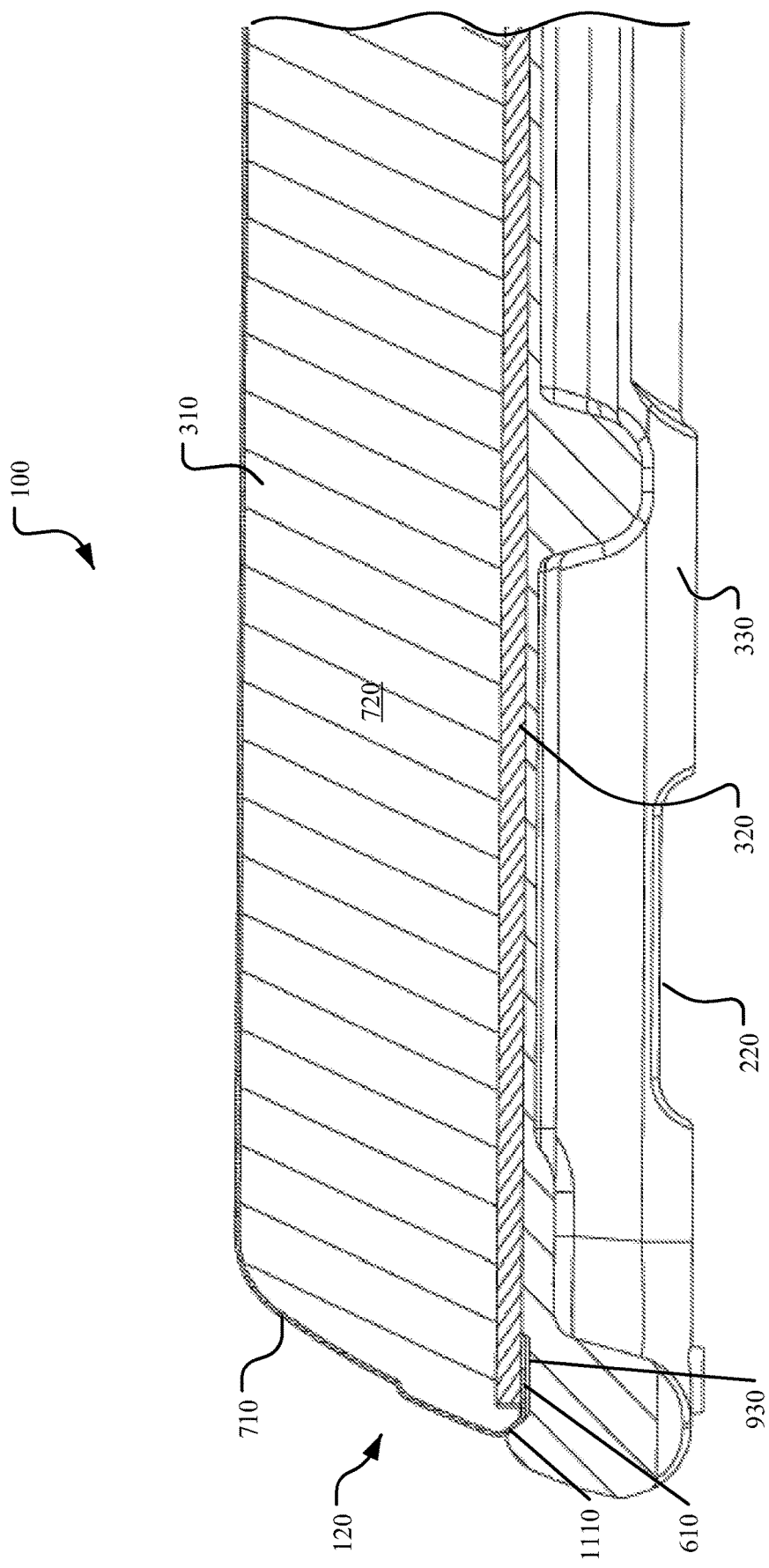
FIG. 11C is an exemplary cross-sectional front view diagram of a step platform having a tapered support ridge in accordance with an exemplary embodiment of the present invention.

The tapered support ridge 1110 may extend along at least a portion of the front, back, and/or sides of the top of the base member 330. For example, the tapered support ridge 1110 may extend along the front and back of the base member 330 such that it contacts the side of the foam member 310 in the cross-section shown in FIG. 11A and in another exemplary cross-section shown in FIG. 11B. In another example, as shown in FIG. 11C, the tapered support ridge 1110 may extend along a side of the foam member 310 to at least partially prevent the foam core 720 from expanding outwardly in its side.

Figure 12:
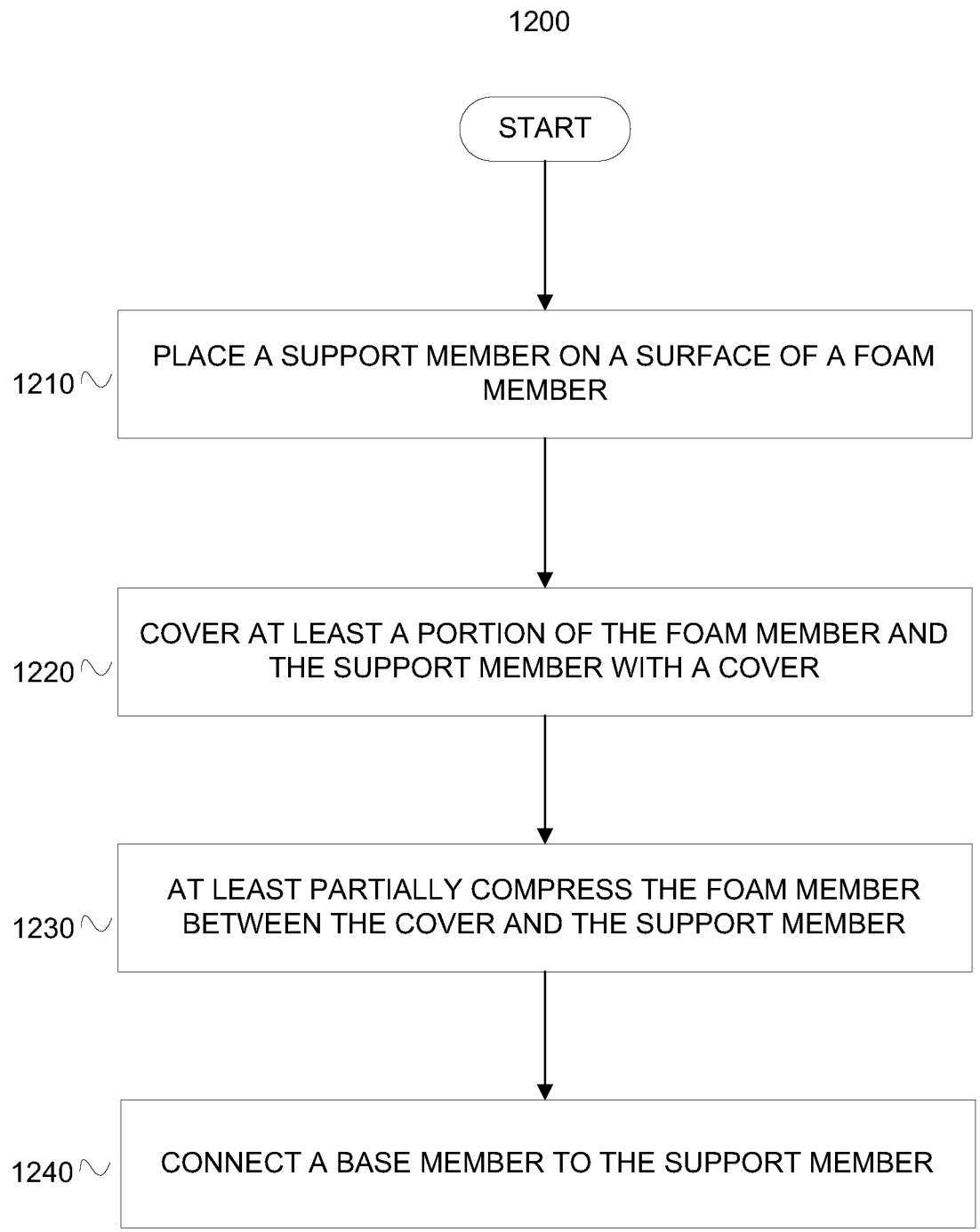
FIG. 12 shows a flowchart of a step platform manufacturing process in accordance with an exemplary embodiment of the present invention.

FIG. 12 depicts an exemplary embodiment of a step platform manufacturing process 1200. The process 1200 may include placing 1210 the support member 320 on a bottom surface of the foam member 310 such that the support member 320 partially covers the bottom surface. In some examples, the support member 320 may include a rigid material and the foam member 310 may include an elastic material. After placing 1210 the support member 320 on the bottom surface, the process 1200 may include covering 1220 at least a portion of the foam member 310 and the support member with a moisture-resistant cover (e.g., the cover 710). The process 1200 may also include at least partially compressing 1230 the foam member 310 between the moisture-resistant cover and the support member 320 to fasten the support member 320 to the foam member 310. In other embodiments, one or more straps or other fastening devices may be used in lieu of the cover 710 to fasten the support member 320 to the foam member 310. By fastening the support member 320 to the foam member 310, it may be easier to connect the foam member 310 to a hard surface. For instance, it may avoid tearing or otherwise damaging the foam member 310 that could occur when the connectors 340 are directly attached to the foam member 310.

Optionally, the process 1200 may further include connecting 1240 the base member 330 to the support member 320 and at least a portion of the foam member 310. In some examples, the base member 330 may be configured to at least partially restrict deformation of the foam member 310 in at least one axis. Connecting the base member 330 may include connecting a top surface of the base member 330 to the support member 320 and at least the portion of the foam member 310, and connecting one or more tapered support ridges (e.g., the tapered support ridge 1110) of the base member 330 to at least a portion of one or more side surfaces of the foam member 310 such that the one or more tapered support ridges at least partially restricts deformation of the foam member 310 in at least two axes.

In some embodiments, covering 1220 at least the portion of the foam member 310 and the support member 320 may include covering a top surface of the foam member 310, one or more sides of the foam member 310, a portion of the bottom surface of the foam member 310, and a portion of the support member 320. This may protect the exposed portions of the foam member 310 from moisture and other elements. In other embodiments, at least partially compressing 1230 the foam member 330 may include sealing the moisture-resistant cover 710 in a fixed position such that the moisture-resistant cover 710 at least partially compresses the foam member 310 against the support member 320. This seal 710 may be temporary or permanent and improve the protection of the foam member 310 and/or the support member 320 from moisture and other elements.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A step platform for aerobic exercise, the step platform comprising:
    an elastic foam member with tapered sides, the elastic foam member configured to at least partially deform when stepped on by the user; and
    a base member connectable to the foam member, the base member having a plurality of exposed tapered sides that continuously taper from a lowermost edge of the base member to an uppermost edge of the base member,
    wherein the base member comprises a tapered support ridge having a flat, angled contact surface operable to abut at least a portion of an outermost edge of one or more of the side surfaces of the foam member, the tapered support ridge tapering in height as it extends inwardly towards a central vertical axis of the base member such that the contact surface of the tapered support ridge forms an obtuse angle with a horizontal axis of the base member and is configured to at least partially restrict deformation of the foam member in at least one direction, the obtuse angle facing the central vertical axis of the base member,
    wherein when the base member is connected to the foam member, each tapered side of the base member combines with an adjacent tapered side of the foam member to form a continuously tapered face of the step platform.

2. The step platform of claim 1, wherein the foam member comprises a moisture-resistant cover, wherein the moisture-resistant cover is configured to at least partially compress the foam member.

3. The step platform of claim 1, wherein the sides of the elastic foam member are tapered such that the length and width of the elastic foam member is approximately 3.5 or 7 inches shorter at an upper surface of the elastic foam member relative to a lower surface of the elastic foam member.

4. The step platform of claim 1 further comprising one or more risers connectable to the base member, the one or more risers having at least one ridge, wherein the base member comprises at least one groove configured to mate with the at least one ridge of the one or more risers.

5. The step platform of claim 1 further comprising a rigid support member connectable to a bottom surface of the foam member such that the support member covers at least a portion of the bottom surface, the support member configured to at least partially maintain a shape of the foam member,
    wherein the base member is connectable to the support member, at least a portion of the bottom surface of the foam member, and at least a portion of one or more side surfaces of the foam member.

6. The step platform of claim 5, wherein the contact surface of the tapered support ridge of the base member is further configured to at least partially restrict deformation of the foam member in at least two perpendicular axes.

7. A bench for supporting a user during stepping exercise, the bench comprising:
- a foam member comprising an elastic material, the foam member having a plurality of exposed tapered sides that continuously taper from a lowermost edge of the foam member to an uppermost edge of the foam member;
- a support member connectable to a bottom surface of the foam member, the support member comprising a rigid material; and
- a base member connectable to at least a portion of the support member and at least a portion of the bottom surface of the foam member, the base member having plurality of exposed tapered sides that continuously taper from a lowermost edge of the base member to an uppermost edge of the base member, each tapered side of the base member combinable with an adjacent tapered side of the foam member to form a tapered face of the bench.

8. The bench of claim 7, wherein the foam member further comprises a moisture-resistant cover surrounding the elastic material.

9. The bench of claim 8, wherein the moisture-resistant cover comprises vinyl.

10. The bench of claim 8, wherein the foam member is configured to deform when stepped on by the user.

11. The bench of claim 7, wherein the elastic material comprises urethane foam, and the rigid material comprises plywood.

12. The bench of claim 7, wherein the foam member has a plurality of pairs of exposed tapered sides that continuously taper from the lowermost edge of the foam member to the uppermost edge of the foam member.

13. The bench of claim 7 further comprising one or more risers connectable to the base member, the one or more risers having at least one ridge, wherein the base member comprises at least one groove configured to mate with the at least one ridge of the one or more risers.

14. The bench of claim 7, wherein the base member comprises a support member, the support member being connectable to at least a portion of one or more side surfaces of the foam member.

15. The bench of claim 7, wherein the foam member further comprises a rigid portion with a stable exercise surface and an elastic portion with an unstable exercise surface, the elastic material forming the elastic portion of the foam member.

16. A method of manufacturing a step platform for aerobic exercise, the method comprising:
- placing a support member into a recess formed by a bottom surface of a foam member such that the support member partially covers the bottom surface of the foam member, wherein the support member comprises a rigid material and the foam member comprises an elastic material and a plurality of exposed tapered sides that continuously taper from a lowermost edge of the foam member to an uppermost edge of the foam member, wherein the support member comprises a top surface, a bottom surface, and side surfaces, and the recess is configured to receive the top surface of support member and at least a portion of each side surface of the support member;
- covering at least a portion of the foam member and the support member with a moisture-resistant cover;
- sealing the moisture-resistant cover to the foam member in a fixed position such that the moisture-resistant cover forms to the one or more exposed surfaces of the foam member and at least partially compresses against the support member to fasten the support member to the foam member; and
- connecting at least a portion of a base member to at least a portion of the foam member, the base member having a plurality of exposed tapered sides that continuously taper from a lowermost edge of the base member to an uppermost edge of the base member,
- wherein, when the at least a portion of the base member is connected to the at least a portion of the foam member, each tapered side of the base member combines with an adjacent tapered side of the foam member to form a continuously tapered face of the step platform.

17. The method of claim 16 further comprising connecting a base member to the support member and at least a portion of the foam member, wherein the base member is configured to at least partially restrict deformation of the foam member in at least one axis.

18. The method of claim 17, wherein connecting the base member comprises connecting a top surface of the base member to the support member and at least the portion of the foam member, and abutting one or more tapered support ridges of the base member against at least a portion of one or more side surfaces of the foam member such that the one or more tapered support ridges at least partially restricts deformation of the foam member in at least two axes.

19. The method of claim 16, wherein covering at least the portion of the foam member and the support member comprises covering a top surface of the foam member, one or more sides of the foam member, a portion of the bottom surface of the foam member, and a portion of the support member.

20. The method of claim 19, wherein at least partially compressing the foam member comprises sealing the moisture-resistant cover in a fixed position such that the moisture-resistant cover at least partially compresses the foam member against the support member.

* * * * *